United States Patent
Fandel et al.

(10) Patent No.: US 7,232,063 B2
(45) Date of Patent: Jun. 19, 2007

(54) SYSTEM AND METHOD FOR MONITORING AND DIAGNOSIS OF POINT OF SALE DEVICES HAVING INTELLIGENT HARDWARE

(75) Inventors: Larry Fandel, San Diego, CA (US); Florentino Factor, Del Mar, CA (US); George Gunny, Carlsbad, CA (US)

(73) Assignee: Fujitsu Transaction Solutions Inc., San Diego, CA (US)

( * ) Notice: Subject to any disclaimer, the term of this patent is extended or adjusted under 35 U.S.C. 154(b) by 0 days.

(21) Appl. No.: 10/842,146

(22) Filed: May 10, 2004

(65) Prior Publication Data
US 2005/0006468 A1     Jan. 13, 2005

Related U.S. Application Data

(60) Provisional application No. 60/476,972, filed on Jun. 9, 2003.

(51) Int. Cl.
*G06K 15/00* (2006.01)
(52) U.S. Cl. .................................. 235/383; 235/376
(58) Field of Classification Search ................ 235/376, 235/383; 705/11
See application file for complete search history.

(56) References Cited

U.S. PATENT DOCUMENTS

| | | | |
|---|---|---|---|
| 5,488,223 A * | 1/1996 | Austin et al. ............... 235/375 |
| 5,712,629 A * | 1/1998 | Curtiss et al. ........... 340/825.5 |
| 6,285,688 B1 | 9/2001 | Henderson et al. |
| 6,288,645 B1 * | 9/2001 | McCall et al. ........... 340/568.2 |
| 6,311,165 B1 | 10/2001 | Coutts et al. |
| 6,367,992 B1 | 4/2002 | Aruga et al. |
| 6,532,435 B1 * | 3/2003 | Aoshika et al. ............. 702/188 |
| 2002/0010865 A1 | 1/2002 | Fulton et al. |
| 2003/0110014 A1 | 6/2003 | Aoshika et al. |

FOREIGN PATENT DOCUMENTS

WO     WO 98/26530     6/1998

OTHER PUBLICATIONS

Hansen, S., R. Halter, R. Kleinman, J. Carrier and J. Dvorak. "IXRetail Equipment Monitoring and Control (REMC) Technical Specification." Nov. 20, 2002 Release 0.9—Candidate Recommendation, pp. 1-79.

* cited by examiner

*Primary Examiner*—Lisa Caputo
(74) *Attorney, Agent, or Firm*—Christie, Parker & Hale, LLP.

(57) ABSTRACT

A point-of-sale ("POS") system includes POS devices and associated monitoring and diagnostic applications. POS peripherals in a POS device include data memory for storing device configuration and status information. A diagnostic application installed in the POS device monitors and diagnoses the POS device. The diagnostic application monitors the interactions between hardware in the POS device and applications that interface with the hardware. The diagnostic applications analyze these interactions, the configuration and status information and any logs it creates to provide diagnostic information. The POS device also includes several interfaces to access the diagnostic application.

63 Claims, 14 Drawing Sheets

SYSTEM AND METHOD FOR MONITORING AND DIAGNOSIS OF POINT OF SALE DEVICES HAVING INTELLIGENT HARDWARE

CROSS-REFERENCE TO RELATED APPLICATION(S)

This application claims the benefit of U.S. Provisional Patent Application No. 60/476,972, filed Jun. 9, 2003, the disclosure of which is incorporated herein by reference.

FIELD OF THE INVENTION

The invention relates generally to the field of data processing and, more particularly, to monitoring and diagnostic applications and intelligent hardware for point of sale devices.

BACKGROUND

A conventional point of sale ("POS") device used in a store consists of a computer system-based cash register terminal that is integrated with several peripheral components. These peripheral components may include, for example, keyboards, displays, printers, scanners and magnetic stripe readers.

Reliability and low maintenance costs are important features of POS devices. POS devices typically operate in demanding retail environments where the POS devices are used continuously and may be subject to abuse. Moreover, in busy retail environments it is important to minimize downtime of the POS device to avoid disgruntled customers and potential loss of sales. As a result, retailers look for a low total cost of ownership when purchasing POS devices. That is, retailers desire POS devices that have minimal downtime and that are relatively inexpensive to repair in the event they do break down.

Manufacturers of some conventional POS devices attempt to achieve low total cost of ownership through the use of diagnostic tools and help desk personnel that are located at one or more central locations. When a retailer encounters a problem with a POS device, the retailer may call a central location to obtain assistance from the help desk personnel. The diagnostic tools are configured to communicate with POS devices located in retail stores. Thus, a help desk attendant may use the diagnostic tools to check the operation of remote POS devices. In addition, the diagnostic tools may operate autonomously to perform diagnostic operations on remote POS devices. Through the use of such centrally located diagnostic tools and personnel, the cost of the tools and personnel may be spread across many POS devices. This, in turn, enables a manufacturer or retailer to reduce the total cost of ownership for each POS device.

Despite the use of diagnostic tools such as those discussed above, owners of POS devices may still experience significant downtime with their POS devices and incur relatively expensive service costs. Hence, a need exists for an improved diagnostic system for POS devices.

SUMMARY OF THE INVENTION

The invention relates to methods and associated systems for monitoring and diagnostic applications and intelligent hardware for POS devices.

One embodiment of a POS device constructed according to the invention is directed to POS peripherals that include data memory for storing device configuration information and status information. For example, a scanner, keyboard, bill dispenser or display peripheral may store a serial number and other configuration information in a data memory. This information may be use to enable a diagnostic application or personnel to unambiguously identify the POS peripheral for asset tracking and identify the installation date or repair history of the POS peripheral.

A POS peripheral also may store usage data, test result data or other status information in a data memory. For example, a scanner may record the number of scans made or number of hours the scanner laser has been operated. This information may be used by a diagnostic application or personnel to estimate the remaining operating life of the POS peripheral. In addition, the scanner may provide self-diagnostic capabilities that test various components of the scanner. The results of such tests may then be stored in the data memory.

Typically the status information is updated when the POS peripheral executes its diagnostic routines. This may occur, for example, when the POS peripheral is powered up, during execution of "normal" run-time diagnostics or in response to an external command (e.g., from a management tool) to execute diagnostics.

In an embodiment where the configuration information or the status information is stored in a non-volatile data memory in the POS peripheral, the information will not be lost when the POS peripheral is moved from one POS device to another. This may enable a diagnostic application or personnel to more effectively track the operating history of the POS peripheral.

The POS peripheral may provide an interface so that the configuration information or status information is accessible by management tools. These management tools may include, for example, a POS terminal, a host management information system and a help desk. Some of these management tools may be located at a location that is remote from the POS peripheral.

One embodiment of a POS device constructed according to the invention is directed to a diagnostic application that monitors and diagnoses the POS device. Typically, the diagnostic application is installed in the POS device.

In one embodiment, the diagnostic application monitors interactions between hardware in the POS device and applications that interface with the hardware. For example, a scanner application that executes on a processor in the POS device may send commands and/or responses to and receive responses and/or commands from a scanner. In this case the diagnostic application may monitor these commands/responses and generate a log of, for example, the number of scan operations performed by the scanner.

The diagnostic application also may analyze these interactions and the logs it creates. As a result of this analysis the diagnostic application may, for example, perform failure analysis, generate maintenance requests and generate alarms.

The diagnostic application may operate advantageously with POS peripherals that store status and configuration information. The diagnostic application may, for example, use the configuration information to unambiguously identify the POS peripheral for asset tracking and identify the installation data or repair history of the POS peripheral. In addition, the diagnostic application may, for example, use the status information to estimate the remaining operating life of the POS peripheral.

In one embodiment, a POS device includes several interfaces to access the diagnostic application. For example, store personnel may access the diagnostic application via a user interface on the POS device. This interface may be used by store personnel to perform, for example, relatively simple diagnostic operations. In addition, remote diagnostic applications and help desk personnel may access a diagnostic application executing on the POS device via a network connection. Here, a network connection interface may be used by help desk personnel to perform, for example, relatively complex diagnostic operations that are beyond the skill of store personnel.

In one embodiment, the diagnostic application provides an integrated interface that displays both computer-related and POS capability-related diagnostic information on a combined display screen.

BRIEF DESCRIPTION OF THE DRAWINGS

These and other features, aspects and advantages of the invention will be more fully understood when considered with respect to the following detailed description, appended claims and accompanying drawings, wherein:

Figure 1:
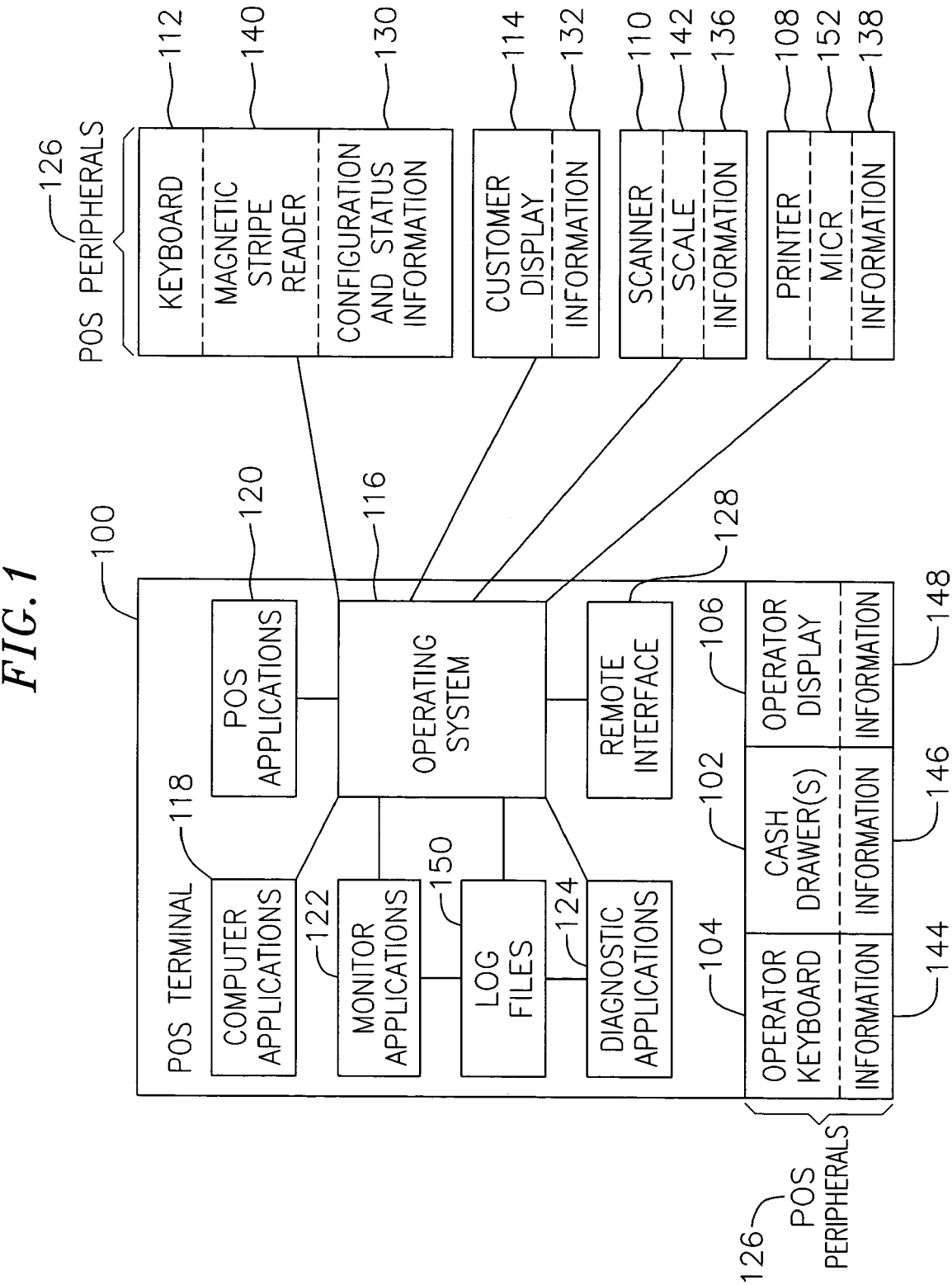
FIG. 1 is a simplified block diagram of one embodiment of a POS device constructed in accordance with the invention.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals denote like features throughout the specification and figures.

DETAILED DESCRIPTION

The invention is described below, with reference to detailed illustrative embodiments. It will be apparent that the invention may be embodied in a wide variety of forms, some of which may be quite different from those of the disclosed embodiments. Consequently, the specific structural and functional details disclosed herein are merely representative and do not limit the scope of the invention.

FIG. 1 is a block diagram of one embodiment of a POS device illustrating several of its major components. The POS device D is a POS terminal 100 that includes associated POS peripherals 126 such as one or more cash drawer(s) 102, an operator keyboard 104, an operator display 106, a printer 108, a scanner 110, a customer keyboard 112 and a customer display 114. As FIG. 1 illustrates, the POS peripherals 126 may or may not be physically attached or attachable to the POS terminal 100.

An operating system 116 controls the operation of the POS device. For example, the operating system 116 controls the execution of several application programs ("applications") loaded onto the POS device. These applications may include computer applications 118, POS applications 120, monitor applications 122 and diagnostic applications 124. The operating system 116 also may control the interactions of these applications with the POS peripherals 126. That is, the applications typically send commands to and receive responses from the POS peripherals 126 via the operating system 116.

The POS applications 120 typically interact with the POS peripherals 126 during sales transactions. For example, an operator of the POS device D may initiate a sales transaction by pressing keys on the operator keyboard 104. In this case, the operator keyboard 104 may send a message to a POS application 120. In response to this message, a POS application 120 may activate other POS applications 120 that track the operation of other POS peripherals 126 and coordinate these activities with the current sales transaction.

These other peripherals and examples of their operations may include, for example: a scanner 110 that scans bar codes on items being purchased; a scale 142 that the operator uses to weigh the items; a display 106 that displays information for the item being purchased such as a description of the item and its cost; a customer keyboard 112 and magnetic stripe reader 140 that the customer uses to pay for the purchase; one or more printers 108 that print a credit card slip and the customer's receipt; and a MICR component 152 for reading and/or printing checks.

Commands and messages sent between the POS applications 120 and the POS peripherals 126 may include, for example: a message from the operator keyboard 104 indicating which key or keys the operator has pressed, this may indicate, for example, that a sales transaction has been initiated; a command from a POS application 120 to the scanner 110 that activates the scanning process; a message from the scanner 110 that indicates the bar code information of an item that has been scanned; a command sent from a POS application 120 to the operator display 106 instructing the operator display 106 to display a description and price of the scanned item; a command sent from a POS application 120 to the customer display 114 instructing the customer display 114 to display a message to the customer instructing the customer to enter payment information; a message from a magnetic stripe reader 140 that contains information from a credit card read by the magnetic stripe reader 140; and a message from a POS application 120 to a printer 108 instructing the printer 108 to print a receipt.

The diagnostics applications 124 may include interfaces (not shown) that enable an operator or other applications to perform diagnostic operations on the components of the POS device D. In some embodiments, an operator of the POS device D may access the diagnostic applications 124 via the keyboard 104 and display 106 on the POS device D. In some embodiments, the diagnostic applications 124 interface with a remote tool that enables remote operators and applications to access the diagnostic applications 124.

The diagnostic applications 124 may interact with the other components of the POS device D to, for example, monitor the operation of and perform diagnostic tests on those components. The diagnostic applications 124 may, in conjunction with the monitor applications 122 discussed below, monitor messages sent to and from POS peripherals 126 to, for example, determine the number of hours a POS peripheral 126 has been operating and the type of operations performed by the POS peripheral 126. Also, the diagnostic applications 124 may perform diagnostic tests on the POS peripherals 126 to verify that they are operating properly. In addition, the diagnostic applications 124 may read status information or configuration information stored in the POS peripherals to determine, for example, the number and types of operations performed by a POS peripheral 126. In the embodiment of FIG. 1, POS peripherals 102, 104, 106, 108, 110, 112 and 114 store configuration and status information 146, 144, 148, 138, 136, 130 and 132, respectively.

The monitor applications 122 monitor commands and messages sent to and received from system components such as the POS peripherals 126 and the hardware of the POS terminal 100. The monitor applications 122 store information related to these commands and messages in one or more log files 146. In this way, other applications such as the diagnostic applications 124 may access the log files 150 to analyze the operation of the system components.

In one embodiment, the monitor applications 122 interact with the operating system 116 to accomplish the monitoring operations. For example, the operating system 116 may include drivers (not shown) that control communications with the POS peripherals 126. Filters (not shown) may be associated with these drivers such that some of the commands and messages sent through the drivers may be identified and processed, then logged in the log files 150.

Computer applications 118 may include, for example, typical personal computer applications such as those that interact with system hardware components such as a hard drive, a display device and a keyboard. These applications may include, for example, the system BIOS.

In one embodiment the POS peripherals 126 include "intelligent hardware" (not shown) that may collect and/or store configuration and status information for the POS peripherals 126. Configuration information may include, for example, serial numbers and version numbers of the POS peripheral's hardware, software and firmware. Status information may include, for example, usage data such as the number and types of operations that a POS peripheral has performed.

A remote interface 128 enables remote operators and applications (not shown) to access information associated with the diagnostic applications 124 that is stored in the POS device D. The operation of the remote interface 128 will be discussed in more detail in conjunction with FIG. 2.

Figure 2:
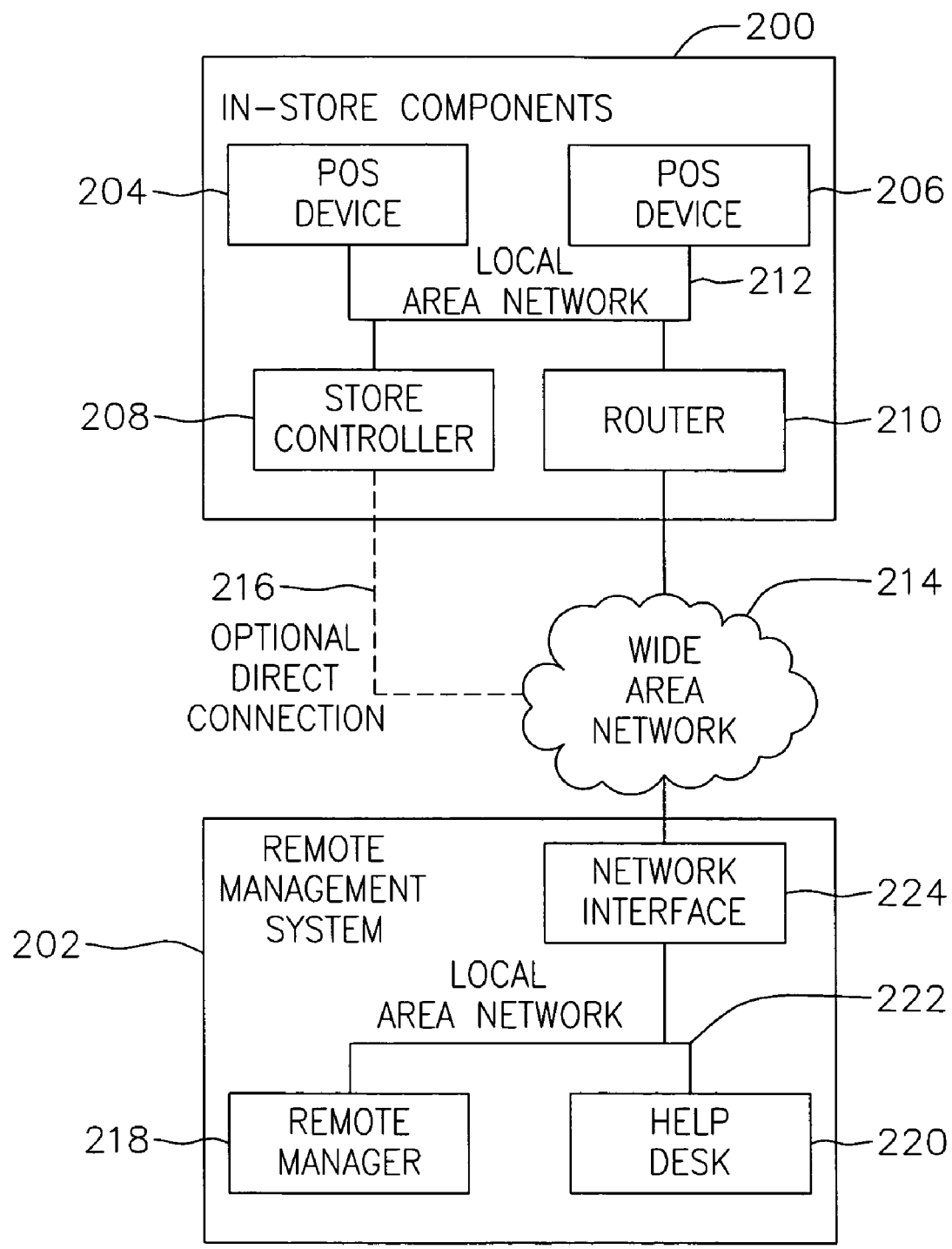
FIG. 2 is a simplified block diagram of one embodiment of a POS system constructed in accordance with the invention.

FIG. 2 is a block diagram of one embodiment of a POS system where POS devices 204 and 206 located in a store 200 may communicate with a remotely located management system 202 via a wide area network 214. In practice, the management system 202 would connect with POS devices in several stores (not shown) via the wide area network 214. In addition, these systems and devices typically would communicate with other data services and data providers (not shown).

The components located in the store may include, for example, the POS devices 204 and 206, a store controller 208, a router 210 and a local area network 212. Operations of each of these components will be discussed in turn.

The POS devices 204 and 206, store controller 208 and router 210 communicate with each other via the local area network 212. The local area network 212 may be implemented, for example, as an Ethernet network that utilizes communication protocols such as TCP/IP. Each of the components that interface with the local area network 212 includes hardware and software that supports communications with the local area network 212 or is associated with an adapter that provides this functionality.

The remote interfaces 128 (FIG. 1) in the POS devices 204 and 206 interface with the local area network 212. Accordingly, a remote interface 128 may include hardware and software that supports communications over an Ethernet network.

The router 210 may be used to enable the in-store components to access external components and vice-versa. Thus, the router 210 includes hardware and software that supports communications with both the local area network 212 and the wide area network 214.

The store controller 208 may be used by store personnel to manage the POS devices 204 and 206 in the store 200. For example, the store controller 208 may include a display and keyboard (not shown) that enables store personnel to access applications and information on the POS devices 204 and 206. The store controller 208 also may include an optional direct connection 216 to the wide area network 214. In this case, the store controller 208 includes hardware and software that supports communications with the wide area network 214.

The management system 202 may include, for example, a remote manager 218, a help desk 220, a local area network 222 and a network interface 224 (e.g., router). Operations of each of these components will be discussed in turn.

The local area network 222 provides connectivity between the remote manager 218, the help desk 220 and, via the network interface 224, the wide area network 214. The local area network 222 may be implemented, for example, as an Ethernet network that utilizes communication protocols such as TCP/IP.

The remote manager 218 (e.g., host MIS) may include diagnostic applications that perform diagnostic operations on the POS devices 204 and 206. For example, these diagnostic applications may collect operational data from all of the POS devices to which it is connected and use the operational data to determine when a particular POS device has failed or needs maintenance.

The help desk 220 may include management tools and provide a user interface that enables help desk personnel to access the POS devices 204 and 206. In a typical scenario, personnel from the store 200 may call the help desk 220 when there is a problem with a POS device 204 or 206. The help desk attendant who answers the call may then use the help desk 220 to access the POS device 204 or 206 to determine the cause of the problem.

This embodiment of the invention enables the help desk management tools 220 and the remote data and data providers to communicate quickly and effectively. For example, this embodiment of the invention may, in effect, provide the help desk 220 with good "visibility" into the POS device's hardware status. As a result, the help desk attendant may be able to quickly recommend a corrective course of action to the in-store personnel. Alternatively, the help desk attendant may remotely initiate corrective action.

Figure 3:
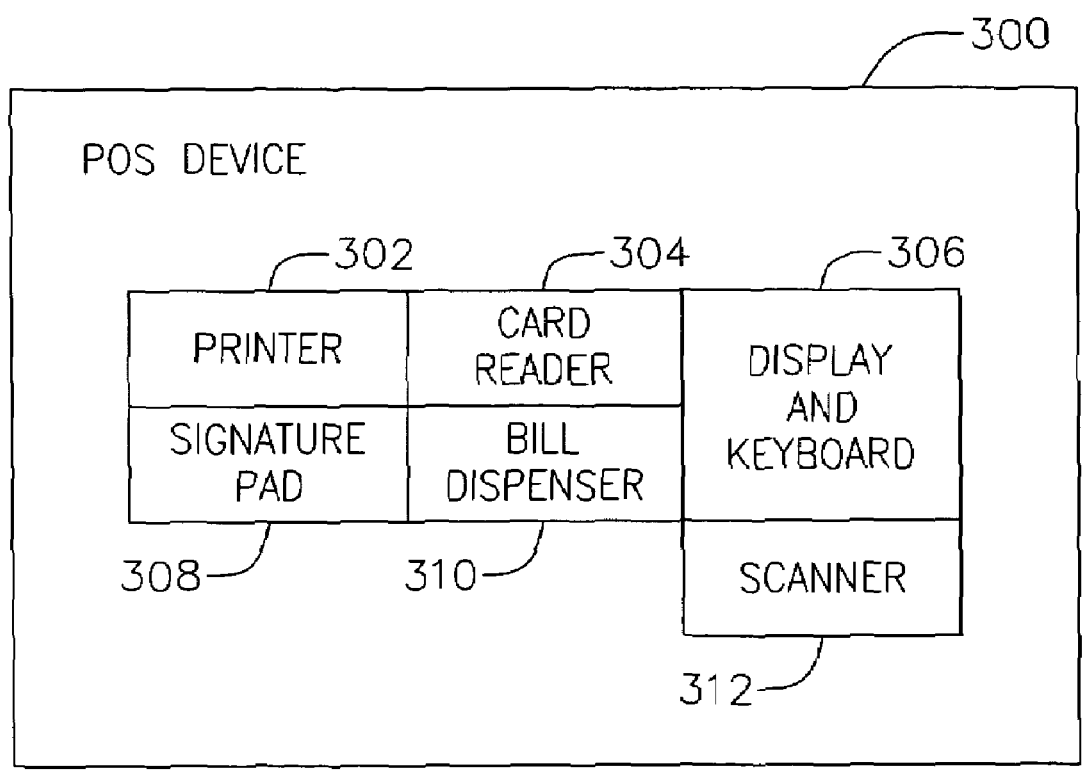
FIG. 3 is a simplified block diagram of one embodiment of a POS device constructed in accordance with the invention.

FIG. 3 is a block diagram of one embodiment of a POS device 300 that may be used, for example, as a self-service checkout terminal in a retail store. In some embodiments the POS device 300 is an integrated unit as represented in FIG. 3. The POS device 300 includes POS terminal components (not shown) as described herein and several POS peripherals. The POS peripherals include a printer 302, a card reader 304, a display and keyboard 306, a signature pad 308, a bill dispenser 310 and a scanner 312. Here, the display and keyboard 306 may consist of a touch screen display that provides soft keys via the touch screen.

In a typical sales transaction, a customer initiates the transaction by touching a soft key on the display and keyboard 306. A message is then displayed on the display 306 prompting the customer to select a payment option such a credit card or cash. Next, a message is displayed on the display 306 instructing the customer to scan the items to be purchased. After all items have been scanned, the customer is prompted to pay for the items. For a credit card transaction, the customer may provide the credit card to the card reader then sign the signature pad. For a cash transaction, the customer may insert currency into the bill dispenser 310. In either case, the bill dispenser may be used to provide currency to the customer. Finally, the printer prints out a receipt for the customer. Conventionally, a self-service payment system will include components (not shown) that help ensure that the customer has scanned all items to be purchased.

The components of the embodiment of FIG. 3 may include "intelligent hardware" as discussed above. Thus, each POS peripheral may collect and/or store configuration and status information.

In addition, the POS device 300 may include monitor applications as discussed above. Thus, the POS device 300 may monitor communications between components to provide data to a diagnostic application.

Figure 4:
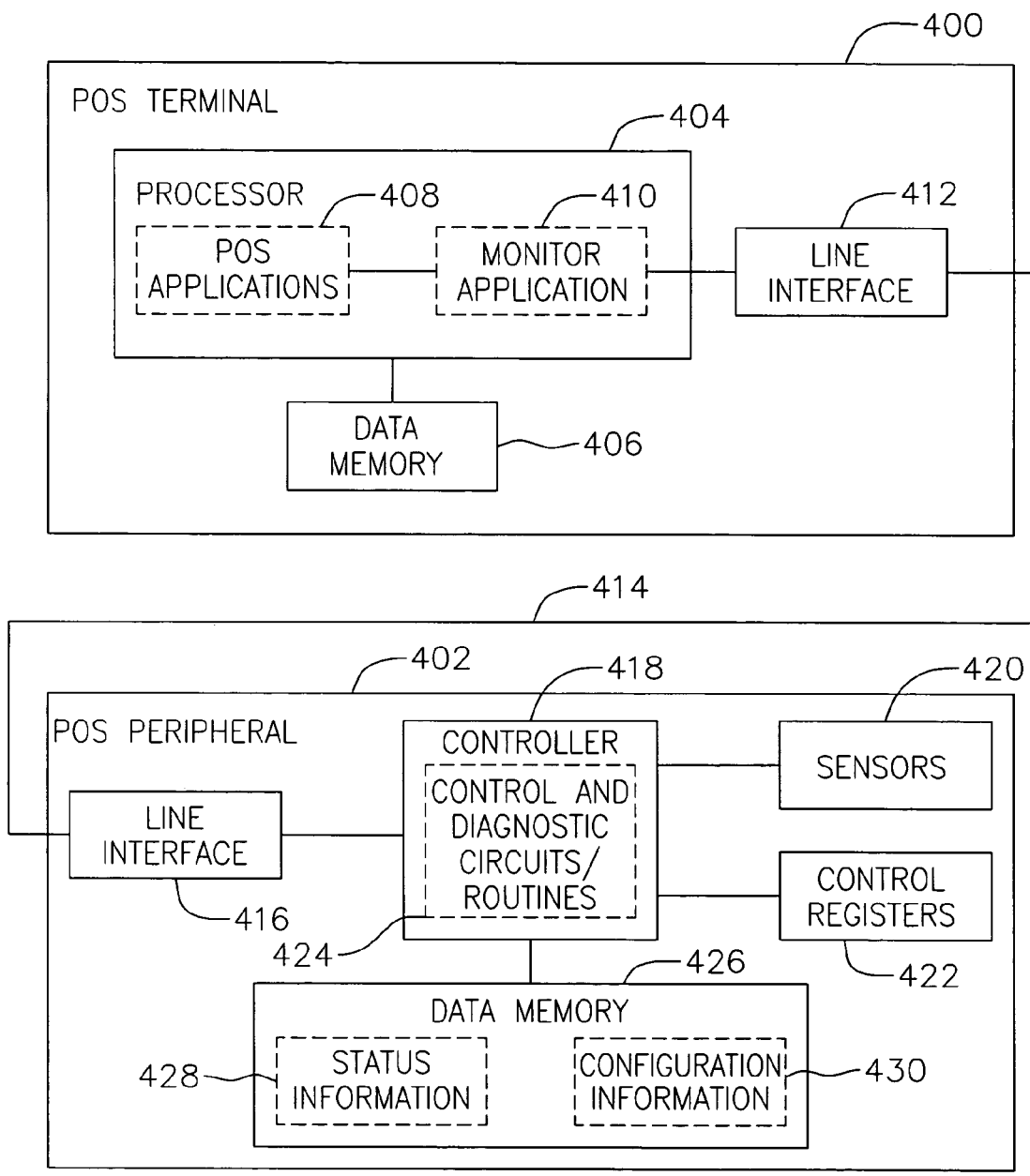
FIG. 4 is a simplified block diagram of one embodiment of a POS terminal and a POS peripheral constructed in accordance with the invention.
Figure 5:
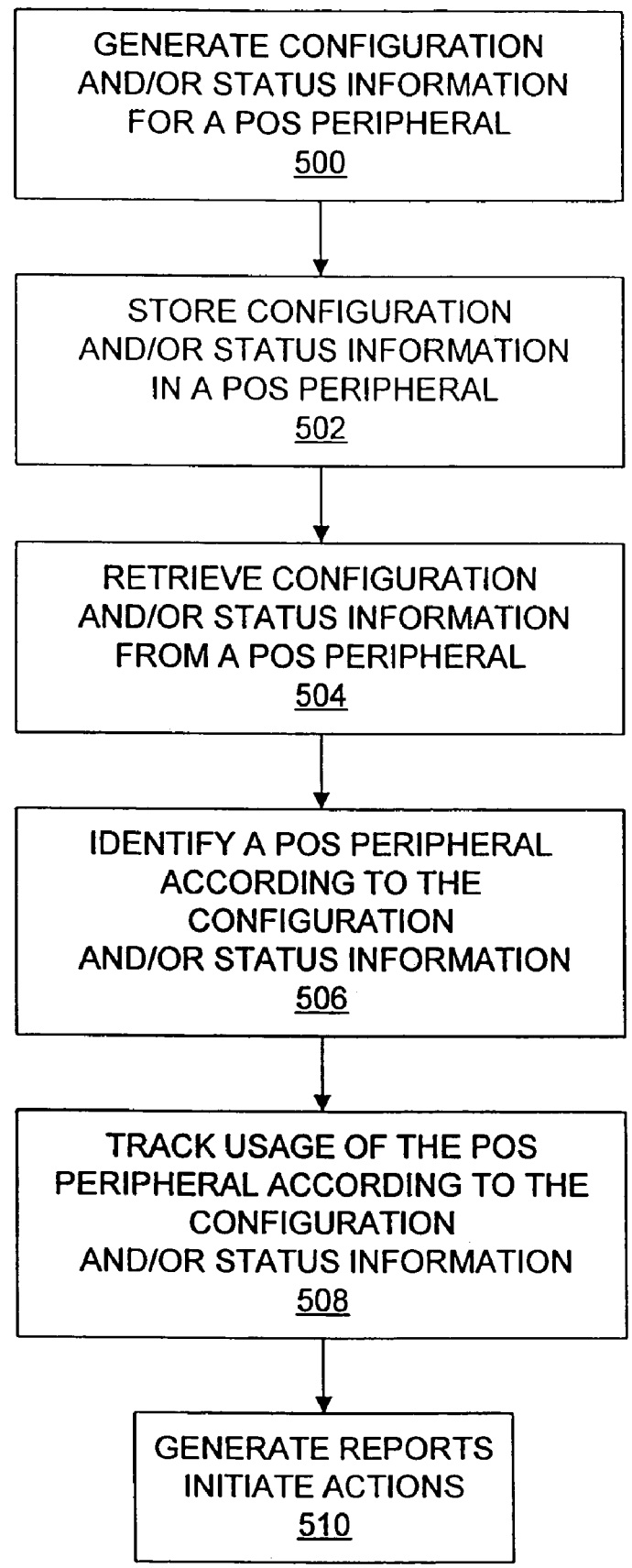
FIG. 5 is a flow chart of one embodiment of operations that may be performed in accordance with the invention.
Figure 6:
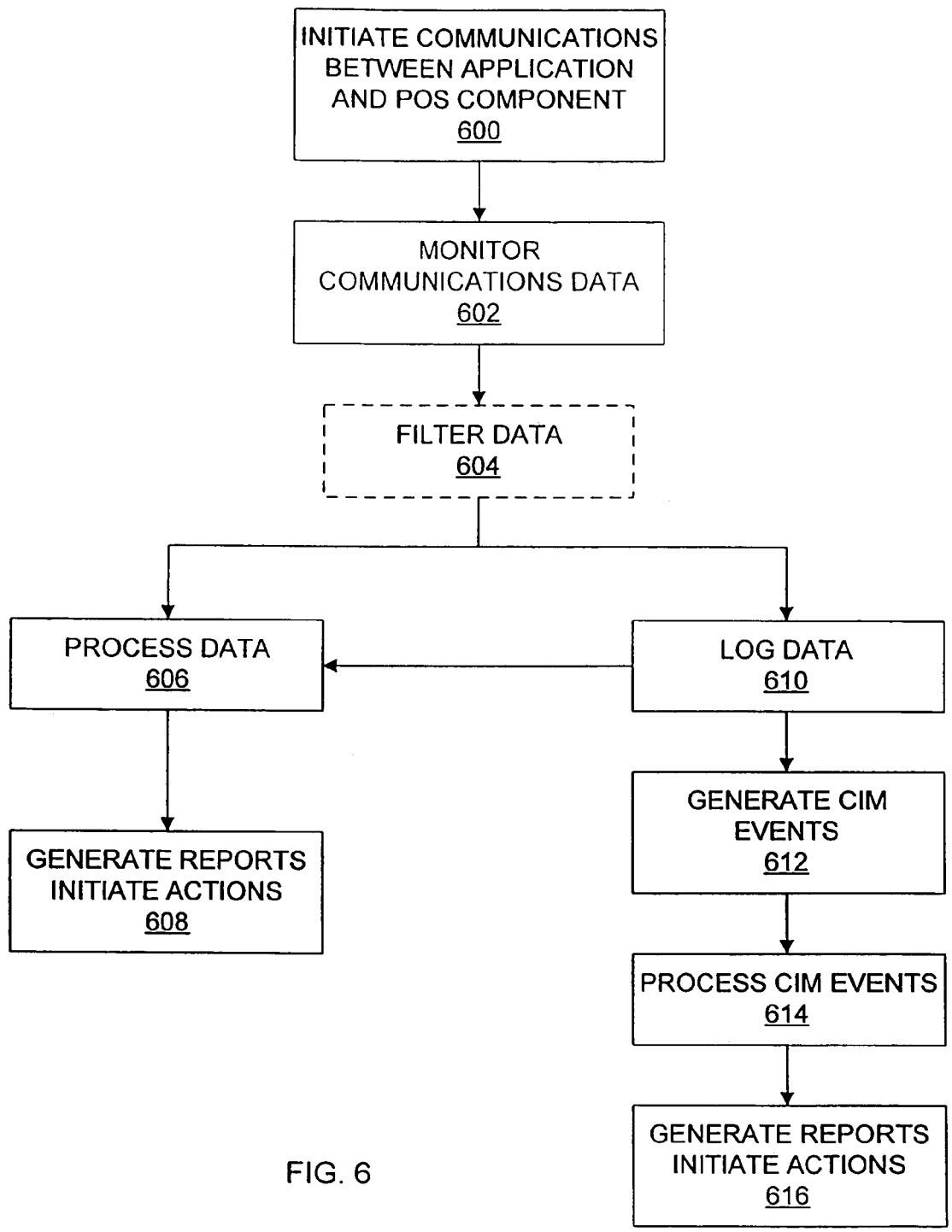
FIG. 6 is a flow chart of one embodiment of operations that may be performed in accordance with the invention.

Examples of structure and methods that may be used to maintain the configuration and status information and monitor communications will be discussed in more detail in conjunction with FIGS. 4, 5 and 6. FIG. 4 illustrates one embodiment of hardware components that may be used to implement a POS terminal and peripheral. FIGS. 5 and 6 illustrate examples of operations that may be performed by hardware or by software executing on the hardware.

FIG. 4 is a block diagram illustrating several aspects of one embodiment of a POS terminal 400 and a POS peripheral 402. The POS terminal 400 and the POS peripheral 402 communicate via a data connection 414. The data connection 414 may consist of, for example, one or more RS-232, USB and/or PS-2 connections. The POS terminal 400 and the POS peripheral 402 include a line interface 412 and 416, respectively, that facilitates communications over the data connection 414.

The POS terminal 400 includes one or more processor(s) (represented by processor 404) and one or more data memories (represented by data memory 406). POS applications 408 executing on the processor 404 communicate with the POS peripheral 402 via the data connection 414. In addition, monitor applications 410 executing on the processor 404 monitor these communications to provide information associated with the POS peripheral 402 to one or more diagnostic applications (not shown). The monitor application 410 may store the information associated with the POS peripheral 402 in the data memory 406.

The POS peripheral 402 includes a controller 418 that may, for example, collect, process and maintain status and configuration information associated with the POS peripheral 402. In some embodiments the controller 418 includes a processor within which control and diagnostic routines 424 are executed. In some embodiments, the controller 418 includes control circuitry 424 that may perform control and diagnostic operations.

The controller 418 may collect information regarding the operating status of components in the POS peripheral 402 by reading data provided by, for example, sensors 420 and/or control registers 422. In addition, in some embodiments the controller 418 may initiate operations in the POS peripheral 402 by writing data to, for example, the control registers 422.

The controller 418 may store the information it collects in a data memory 426. This information may include status information 428 and/or configuration information 430.

In some embodiments the data memory 426 consists of a non-volatile memory. In this case, data stored in the data memory may not be lost in the event the POS peripheral is powered down or moved to another POS device.

An example of operations that may be performed to track usage of and provide diagnostics services for a POS device are illustrated in the flowchart of FIG. 5. As represented by block 500, configuration information and/or status information is generated for a given POS peripheral. This information may be generated when the POS peripheral is manufactured or may be generated at some later point in time. In addition, this information may be generated by the POS peripheral or by some other component. For example, a programming device may generate configuration information such as a serial number when the POS peripheral is manufactured. Alternatively, status information, such as the number of hours the POS peripheral has been powered on, may be continually generated by circuitry (e.g., sensors and counters) in the POS peripheral when the POS peripheral is operating.

Next, as represented by block 502, the configuration information and/or status information is stored in the POS peripheral. This information may be stored when the POS peripheral is manufactured or at some later point in time as discussed above in conjunction with block 500.

When the POS peripheral is operating, circuitry on the POS peripheral or an application such as a diagnostic application may retrieve the configuration information and/or status information (Block 504). This information may be retrieved, for example, on a periodic basis or in response to a predefined condition. Such a condition may result, for example, from monitoring the communications to and from the POS peripheral.

As represented by block 506, an application such as a diagnostic application may process the retrieved information to uniquely identify the POS peripheral. In one example, this may involve analyzing the retrieved serial number of the POS peripheral.

The application may then track usage of the POS peripheral and its components by analyzing and storing other information (e.g., usage statistics and life expectancy data) as represented by Block 508. Typically this is done on an ongoing basis.

Finally, the application may analyze the usage information to generate reports and/or initiate actions as necessary (Block 510). This also may, for example, be done periodically or in response to certain conditions.

An example of operations that may be performed to monitor communications in a POS device to track usage of and provide diagnostics services for the POS device are illustrated in the flowchart of FIG. 6.

As represented by block 600, an application such as a POS application will periodically communicate with a POS peripheral or, in some cases, a specific component in the POS peripheral.

A monitor application monitors these communications as represented by Block 602. In some embodiments the monitored information may be optionally filtered to eliminate information that is not of interest (Block 604). In this case, the filtered data may either be processed in real time (Block 606) or it may be stored in a log file (Block 610).

In some embodiment, all information is logged then filtered during subsequent processing.

Typically, data is stored in the log file then processed at some later point in time (Block 606). As discussed herein, this processing may involve generating usage information based on the monitored traffic and performing failure analyses based on the usage information. For example, after identifying the POS peripheral, an application may determine whether a component in that POS peripheral has failed or is nearing the end of its operating life. The later determination may involve, for example, comparing the usage data to the operating life expectancy of the component.

Next, an application may analyze the processed data to generate reports and/or initiate actions as necessary (Block 608). These actions, may involve, for example, generating recommendations as to when a particular component should be replaced.

In some embodiments, the POS device processes the logged data to generate Common Information Model ("CIM") Events (Block 612). CIM Events may then be processed by, for example, conventional management tools (Block 614) to generate reports and/or initiate actions as appropriate (Block 616).

Figure 7:
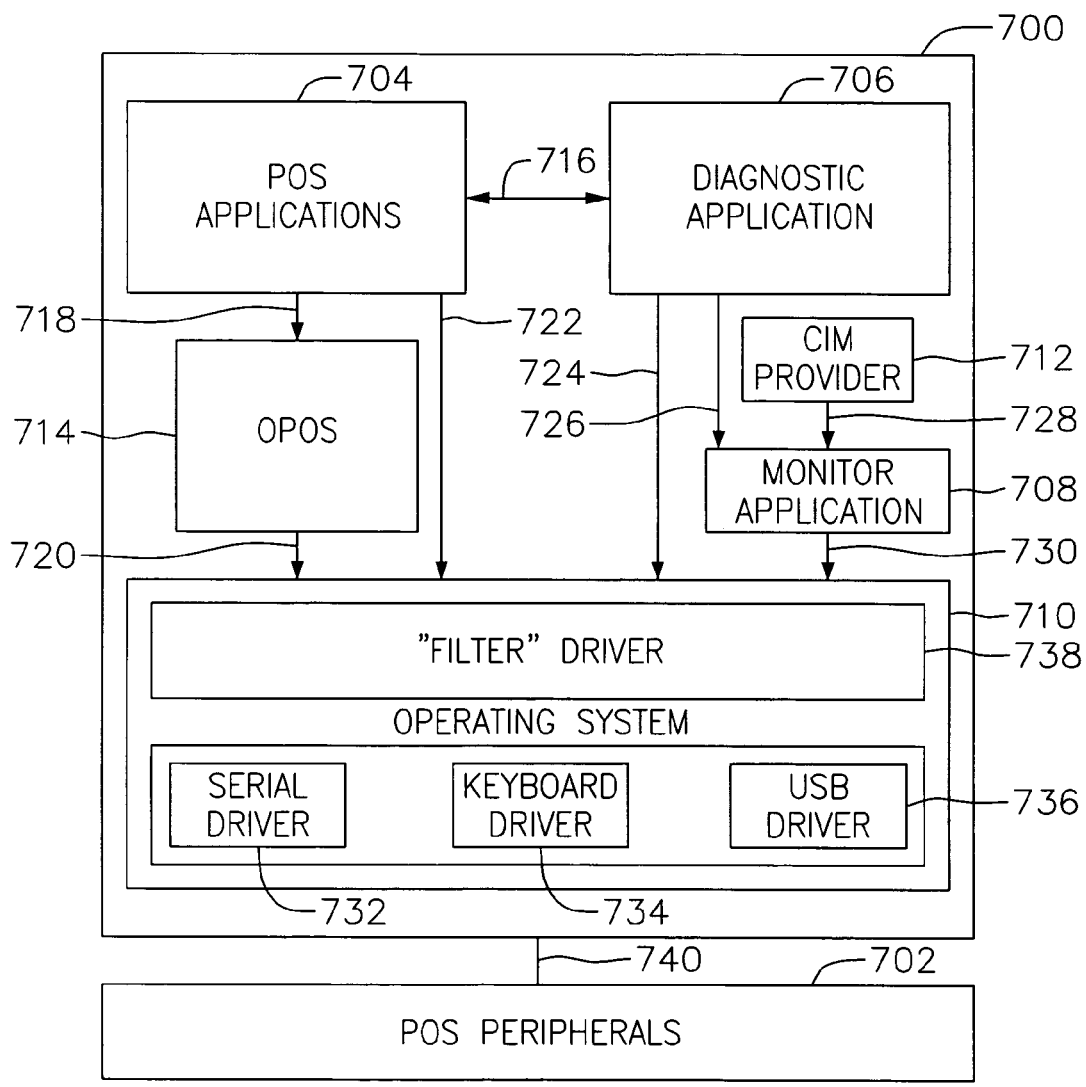
FIG. 7 is a simplified block diagram of one embodiment of a POS device constructed in accordance with the invention.

Referring now to FIG. 7, one embodiment of a POS device D constructed according to the invention will be described in detail. In a manner similar to conventional computer systems, an operating system 710 controls execution of applications installed on the POS device D. Thus, the operating system 710 handles the passing of commands and messages between applications and the POS peripherals 702 as represented by the lines between the blocks in FIG. 7. Thus, the POS applications 704, a diagnostic application 706 and a monitor application 708 access the POS peripherals 702 via the operating system 710. The operating system 310, in turn, communicates with the POS peripherals 702 via, for example, serial port drivers 732, keyboard drivers 734 and/or USB drivers 736. The operating system 710 also includes filter drivers 738 that enable the monitor application 708 and the diagnostic application 706 to log and analyze commands and messages sent to and received from the POS peripherals 702. In addition, the system includes a CIM Provider 712 that enables external systems to access the diagnostic application 706 and the logged data (not shown).

As discussed above, the POS applications 704 interact with the POS peripherals 702 during sales transactions and other operations. For example, when a POS application 704 is invoked by the operating system 710, the POS application 704 may initiate a procedure to send a command to the POS peripheral 702. The operating system 710 passes the appropriate message to the POS peripheral 702 via one of the drivers 732, 734 or 736 and a corresponding connection, represented by line 740. The POS peripheral 702 may also send a message back to the POS application 704 via the one of the drivers 732, 734 or 736. In this case, the operating system 710 passes a corresponding message back to the POS application 704.

The POS applications 704 also interact with the diagnostic application 706 and the OPOS 714 as represented by the lines 716 and 718, respectively. For example, the diagnostic application 706 may invoke a POS application 704 to execute a diagnostic test. The OPOS 714 is a collection of COM objects that are used by the POS applications 704 to communicate with the devices in the system such as the POS peripherals 702.

The monitor application 708 monitors the command and response data stream of the POS peripherals 702. In addition, the monitor application 708 controls monitoring activities, statistic gathering and the CIM Event provider.

The monitor application 708 may, based on analysis of the data traffic, discover which components (e.g., POS peripherals 702) are connected to the POS device D. This is possible because some of the POS peripherals 702 have characteristic data streams that may be uniquely identified by analysis of the data traffic.

The monitor application 708 maintains a descriptive disk file that details which POS peripherals are connected to a POS device, along with the times of their appearance (e.g., connection) and disappearance (e.g., disconnection).

The monitor application 708 may monitor the data stream between the POS applications 704 and the POS peripherals 702 in real-time. Relevant data is gathered and logged, in one embodiment, to a disk file for later processing. The disk file is limited in size, with the limits being set per monitored device (so that no one device can overrun the storage capacity). Accordingly, the data is organized in a circular queue manner. If data is overwritten before it has been processed by the CIM Provider 712, counts of the number of messages lost may be maintained.

As the data stored in the POS device's log files is made available to the management tools (e.g., the diagnostic application 706 and/or the remote management system 202 in FIG. 2), it is useful to use a standard mechanism for transmitting the data. In one embodiment, CIM is used as such a mechanism. When CIM is being used, CIM Properties, Methods, and Events are defined so that the remote management tools may query the CIM Provider 712. The data retained by the CIM Provider 712 is maintained in an industry standard format to allow disparate management tools to analyze the data. An interface program may be used to manually configure the monitor application 708. This configuration operation consists of manipulating registry entries specific to the monitor application 708. If OPOS 714 is installed, then it may be possible to query the registry for these assignments and transform them into monitor specific entries.

The monitor application 708 gains access to the data stream via one or more filter drivers 738. In a Windows operating environment, POS peripherals 702 may be operated via a serial communications type protocol. For example, the POS devices to be monitored typically are connected to the POS device via a PS/2 style keyboard interface, a USB hub interface or a serial interface. A filter driver 738 layered on top of the Windows standard serial drivers captures the protocol traffic (e.g., the data stream). Thus, the filter driver(s) 738 may support, for example, USB and Serial printers, and USB and PS/2 keyboards.

In one embodiment, the filter driver 738 collects all data that is sent to and received from specified POS peripherals. In this case, the monitor application 708 searches the log data to parse out messages and/or data that are to be analyzed for diagnostic purposes. In one embodiment, the monitor application 708 uses event definitions from an event definition file to determine which messages and/or data are to be parsed out.

In another embodiment, the filter driver 738 refers to the event definitions that define the types of messages and/or data that should be collected. In this case, the resulting log files may be smaller. On the other hand, additional processing may be required of the filter driver 738 which, in turn, may adversely impact the real-time performance of the POS device D.

Examples of data that may be used for diagnostic purposes include, for example, messages that are stored in an error log such as I/O error message that may indicate that a POS peripheral is not operating properly, and messages that are stored in a status log such as connect/disconnect messages that may be used to indicate usage of the POS peripheral.

The diagnostic application 706 provides a diagnostic and store-level reporting capability. For example, the diagnostic application 706 enables an operator to determine whether a POS device's peripherals are properly connected and functioning to a minimum operational level. In addition, the monitor application 708 may automatically monitor the POS device D including the POS peripherals 702 and generate alarms and other error messages that are sent to a user interface or to a remote management tool.

The diagnostic application 706 may provide, for example, the capability to execute tests to verify reliable operation of the POS peripherals 702. These tests may involve executing repetitive test cycles. To prevent interference with normal operations of the POS device D, these tests may be performed when the POS applications 704 are not running.

Idle mode probes also may be performed by the diagnostic application 706. The diagnostic application 706 may obtain control of the system from the applications when a user of the POS device D logs off. During idle mode probing, the serial numbers of the POS peripherals 702 and other information may be queried. The diagnostic application 706 will return control when a user logs back on to the POS device D.

In addition, the POS device D has a Ports Off switch that can be used for "hot-swapping" peripherals. This switch affects the connectors that are powered (DB9 serial). Powering off the devices has the effect of causing DTR to drop for serial devices. If the monitor application is monitoring DTR, it can infer that Ports Off has occurred at this time and use the interval to its advantage. For example, application I/O can be blocked until power is restored and the serial numbers of the POS peripherals 702 interrogated. This opportunity may be exploited for POS peripherals that use powered RS232 ports. Typically, the powered USB ports are not affected by the Ports Off switch.

Also, when a POS system D is idle for some period of time, it might be possible for the monitor application 708 to probe the device to insure that it is still properly functioning. This probing, however, should be implemented in a way that will not interfere with normal POS device operation.

The diagnostic application 706 also may read the log files, POS configuration and status information and other data to determine the current state of the system. For example, error log files maintained by the monitor application 708 may contain a POS peripheral's error messages. The diagnostic application 706 may use the error log data generated by the monitor application 708 to pinpoint the site of an error and, if possible, to diagnose the cause of an error. In addition, it may be possible to evaluate the contents of the messages to predict when a failure is imminent.

Life-cycle statistics maintained in the POS device D detail the usage history of a POS peripheral 702 and may be useful in predicting when a POS peripheral 702 will need standard maintenance or when a device is likely to need replacement. Life-cycle statistics can be accumulated reliably if each POS peripheral 702 reports a unique serial number so that the usage data can be properly tallied.

These statistics, however, might not always be completely precise. If a POS peripheral 702 is "hot-plug" replaced then the usage statistics of the new POS peripheral 702 may be applied against the old POS peripheral 702 until rediscovery. Rediscovery may occur, for example, at re-boot, or whenever the diagnostic application takes over idle mode.

A priority for most stores is to quickly restore terminal use, and component swapping is the most commonly used problem solving technique. The diagnostic application used with the monitored database as discussed herein may provide a more deterministic means of swapping components. As a result, operators may be able to avoid "trial and error" component swapping that is commonplace today.

In one embodiment, the diagnostic application 706 is a shell that supports the testing and reporting process. Diagnostic testing is scripted. The scripts are implemented in HTML pages using JavaScript, standard COM objects and custom COM objects.

The data collected by the monitor application 708 may be made available to management tool applications via a CIM Provider 712. Typically, the monitor application 708 processes the monitored data stream on behalf of a remote or local entity.

A remote management tool may request the CIM Provider 712 to retrieve specific pieces of information. Thus, when requested by a remote management tool, the CIM Provider 712 may transfer the reduced or raw error statistics and characteristic data to the management tool for further processing.

Alternatively, the requested data may require an active response that involves data analysis and processing as opposed to simply searching and retrieving data from the log files. For example, when requested by either the diagnostic application or by a remote management tool, the SNMP agent 712 may process the data saved by the monitor application 708 to extract statistics and error characteristics.

Errors and status may be embedded in a POS peripheral's response to commands, or sometimes in asynchronous "ASB" messages. Each POS peripheral may have a set of stateless rules that may be applied to each response. These rules extract the status and error codes. These rules may be encoded in a higher level syntax.

When data is processed in real-time, the CIM Provider may issue alerts (traps) whenever a fault threshold is exceeded. This operational characteristic is desirable when attempting to reduce the time lag between the occurrence and correction of an error.

Typical POS peripheral components that may be monitored include one or more cash drawers, check printer, controller, key lock (e.g., on a keyboard), keyboard, magnetic ink character recognition ("MICR") reader (printer), magnetic stripe reader, personal computer, POS key (e.g., on a keyboard), receipt printer, scale, scanner, slip printer, VFD (display) and a bill dispenser. One or more of these peripherals may be combined into a single physical component and/or integrated into the POS device.

In addition to the POS peripherals, the POS system may monitor other components in the system to provide integrated diagnostic capabilities. For example, the fans in the POS system may generate alarms. Also, the power supply may generate power fail alarms and, if applicable, fan alarms. The batteries in the POS device may generate signals indicative of whether the batteries are low or the charger is charging or defective. Also, the CMOS and other data memory in the POS device typically store checksum information that may be checked to verify the integrity of the data in the data memory.

In some embodiments of the invention, the POS peripherals may provide configuration information and status information that may be accessed by the POS device or other devices. For example, a POS peripheral may store a serial number, date of manufacture, firmware level information and usage data in a data memory. The diagnostic application or other management applications may use this information to enable unambiguous identification of the POS peripheral for asset tracking, device installation date, repair history and other related functions. This information also may be used to query the POS peripheral to determine the remaining useful life of the POS peripheral (as defined by the design life of the POS peripheral).

In some embodiments, the following information may be maintained for each POS peripheral: Number of hours powered; Device category; Manufacturer; Model name; Serial number; Date of Manufacture; Firmware revision; Interface; Status; Last Reported Code; and Programming Update Date. More examples of such information will be discussed in the examples of POS peripherals that follow.

Figure 8:
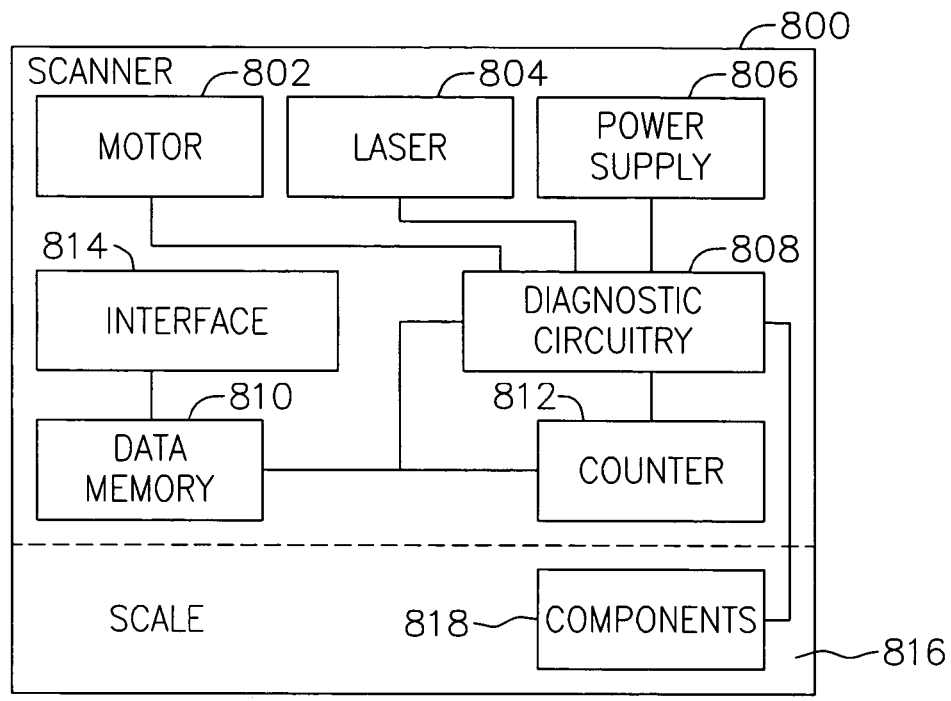
FIG. 8 is a simplified block diagram of one embodiment of a scanner constructed in accordance with the invention.

FIG. 8 depicts one embodiment of a scanner 800 constructed according to the invention. The scanner 800 includes scanning components with one or more motors (represented by motor 802), one or more lasers (represented by laser 804) and a power supply 806.

In addition, the scanner includes diagnostic circuitry 808 that tracks the operation of the other components. For example, interface circuits connect the diagnostic circuitry 808 to the motor 802, laser 804 and power supply 806 to monitor signals that may be processed to determine the usage of these components. These signals may be monitored, for example, using one or more sensors (not shown) located in or associated with these components. Usage may include, for example, the number of times the motor 802 or the laser 804 has been activated and the total number of hours each of these components has been used. The diagnostic circuitry 808 may operate in conjunction with circuitry (e.g., one or more counters as represented by counter 812) to generate usage data indicative of this usage and to store the usage data in one or more data memories (represented by data memory 810).

The scanner 800 also includes diagnostic circuitry 808 that may test the operation of the components in the scanner 800. The diagnostics circuitry 808 also includes circuitry to generate test result data associated with these tests and store the test result data in the data memory 810. The test result data may include PASS/FAIL results of tests on the operational status of the scanner's components including, for example, ROM, EEPROM, external RAM and internal RAM (not shown). In addition, the test result data may indicate the PASS/FAIL operational status of the motor 802 or the laser 804. Also, data related to the operating life (e.g., 80% of operating life used) of the scanner 800 and/or its components such as laser 804 may be stored in the data memory 810.

In an embodiment where the scanner 800 includes a scale 816, the test result data may include PASS/FAIL results of tests on the scale's components 818 such as sensors, ASIC components, ROM, RAM and EEPROM. In addition, the test result data may indicate that the scale 816 needs to be calibrated.

Other types of status information that may be stored in the data memory include, for example: the number of times the motor or the laser is activated; and whether the motor is powered on.

The data memory 810 also may store configuration information. Configuration information may include, for example, a serial number, a model number, the version of the firmware for the scanner 800 or the scale 816, the configuration of the scanner 800 (e.g., scanner only or scanner with scale), the configuration of the scale 816 (e.g., single or dual cable), and the type of communications interface (e.g., RS-232). The configuration information may be used, for example, to enable a diagnostic application or personnel to unambiguously identify the scanner 800 for asset tracking and identify the installation date or repair history of the scanner 800.

The configuration information may be stored in the data memory 810 at various times. For example, the information may be stored when the scanner is constructed or, through the use of an appropriate utility program, at some other time. In addition, the information may be set by the scanner 800.

Typically, the data memory 810 is implemented as a non-volatile data memory so that the usage information is not lost when the scanner is not powered. Thus, if the scanner is moved from one POS device to another, the data in the data memory will be maintained. In this way, the configuration and status of the scanner 800 may be accurately tracked throughout its operating life.

The scanner 800 also includes an interface 814 (e.g., line interface 416 described in FIG. 4) that enables the information stored in the data memory to be sent to an external device such a POS device. This information may be sent, for example, in response to a command from the POS device or of a management system or sent automatically by the scanner, for example, as a result of a diagnostic test.

The interface 814 also may be used to enable the scanner 800 or components in the scanner 800 to communicate with external components. For example, an application executing on a POS terminal may send commands to the scanner 800 via the interface 814 to initiate diagnostic routines. In addition, the diagnostic circuitry 808 may use the interface 814 to report the results of diagnostic routines.

Figure 9:
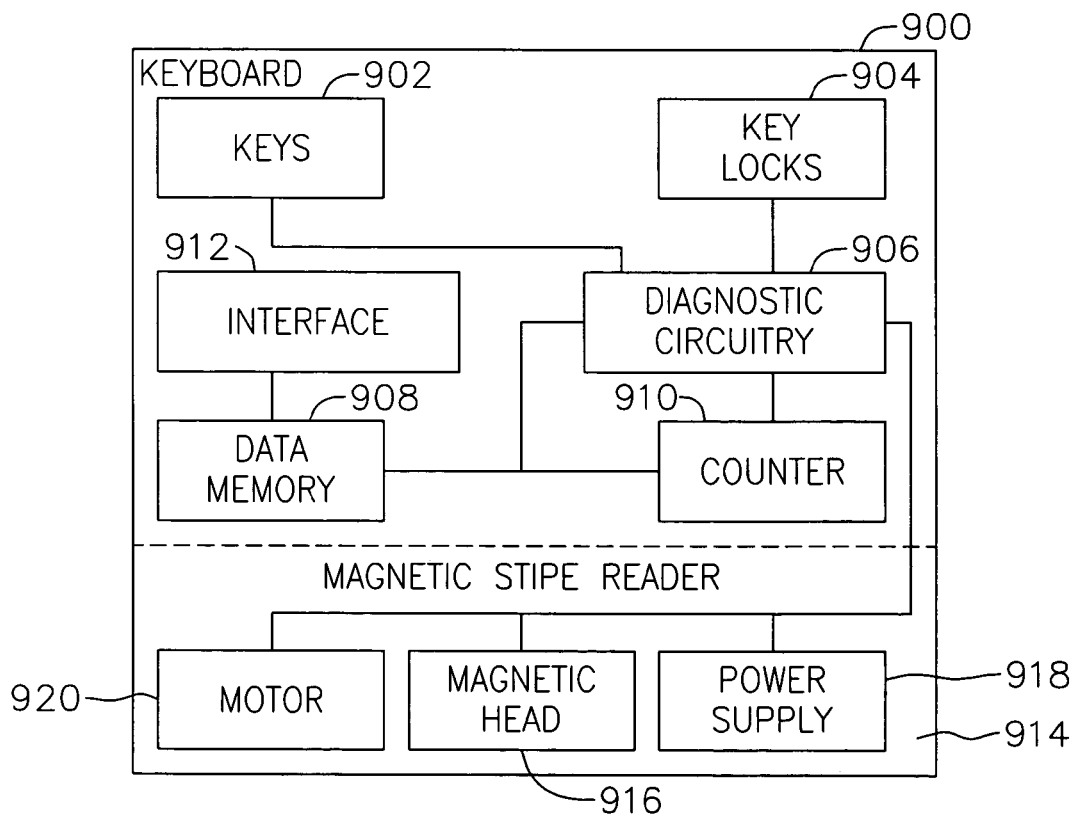
FIG. 9 is a simplified block diagram of one embodiment of a keyboard constructed in accordance with the invention.

FIG. 9 depicts one embodiment of a keyboard 900 constructed according to the invention. The keyboard 900 includes standard keyboard components such as keys 902 and key-locks 904, and may optionally include other components such as a magnetic stripe reader 914.

The keyboard 900 also includes diagnostic circuitry 906 that can track the operation of these components. For example, interface circuits connect the diagnostic circuitry 906 to the keys 902, key-locks 904, magnetic stripe reader 914 and its power supply 918, magnetic head 916 and optional motor 920 to monitor signals that may be processed to determine the usage of these components. These signals may be monitored, for example, using one or more sensors (not shown) located in or associated with these components.

Usage may include, for example, the number of hours the keyboard 900 has been powered on, the number of times the keys 902 have been depressed (for all or only some of the keys, e.g., numeric and other frequently used keys) and the number of times the position of a key-lock 904 has changed. For the magnetic stripe reader 914, usage may include, for example, the number of times it has read a card, the number of bad reads and the total number of hours it has been operated. The diagnostic circuitry 906 may operate in conjunction with circuitry (e.g., one or more counters as represented by counter 910) to generate usage data indicative of this usage and to store the usage data in one or more data memories (represented by data memory 908).

The keyboard 900 also includes diagnostic circuitry 906 that may test the operation of the components in the keyboard 900. The diagnostic circuitry 906 also includes circuitry to generate test result data associated with these tests and to store the test result data in the data memory 908. This test result data may include PASS/FAIL results of tests on the operational status of the internal components of the keyboard 900.

In an embodiment where the keyboard 900 includes a magnetic stripe reader 914, the test result data may include PASS/FAIL results of tests on the operational status of the internal components of the magnetic stripe reader 914 such as the magnetic head 916, the power supply 918 and the optional motor 920. Also, data related to the expected operating life of the magnetic stripe reader 914 and/or its components (e.g., 80% of operating life used) may be stored in the data memory 908.

Other types of status information that may be stored in the data memory include, for example, whether a number key has been pressed and other usage information (e.g., number of times pressed) relating to the number keys: N0, N1, N2, N3, N4, N5, N6, N7, N8, N9. Status information also may include information relating to, for example, usage of the following keys: A, E, TAB, ESC, ENTER, LEFT SHIFT, RIGHT SHIFT, DOWN, RIGHT and OPOS1. For the MSR, status information may include, for example, the number of good reads; the number of failed reads; and the communication error rate (e.g., failure percentage). For the key locks status information may include, for example, changes in the position of the number lock and changes in the position of the key-lock.

The data memory 908 also may store configuration information. Configuration information may include, for example, the type of keyboard (e.g., model number), serial number, date of manufacture, version of the firmware, type of magnetic stripe reader (e.g., 3 track), N-key rollover setting, type of interface (e.g., USB or PC-AT), last keyboard programming update and tone setting for a tone generator. The configuration information may be used, for example, to enable a diagnostic application or personnel to unambiguously identify the keyboard 900 for asset tracking and identify the installation date or repair history of the keyboard 900.

The configuration information may be stored in the data memory 900 at various times. For example, the information may be stored when the keyboard 900 is constructed or, through the use of an appropriate utility program, at some other time. In addition, the information may be set by the keyboard 900.

Typically, the data memory 908 is implemented as a non-volatile data memory so that the usage information is not lost when the keyboard 900 is not powered. Thus, if the keyboard 900 is moved from one POS device to another, the data in the data memory will be maintained. In this way, the configuration and status of the keyboard 900 may be accurately tracked during its operating life.

The keyboard 900 also includes an interface 912 (e.g., line interface 416) that enables the information stored in the data memory 908 to be sent to an external device such a component in the POS device. This information may be sent, for example, in response to a command from the POS device or a management system or sent automatically by the keyboard, for example, as a result of a diagnostic test.

The interface 912 also may be used to enable the keyboard 900 or components in the keyboard 900 to communicate with external components. For example, an application executing on a POS terminal may send commands to the keyboard 900 via the interface 912 to initiate diagnostic routines. In addition, the diagnostic circuitry 906 may use the interface 914 to report the results of diagnostic routines.

Figure 10:
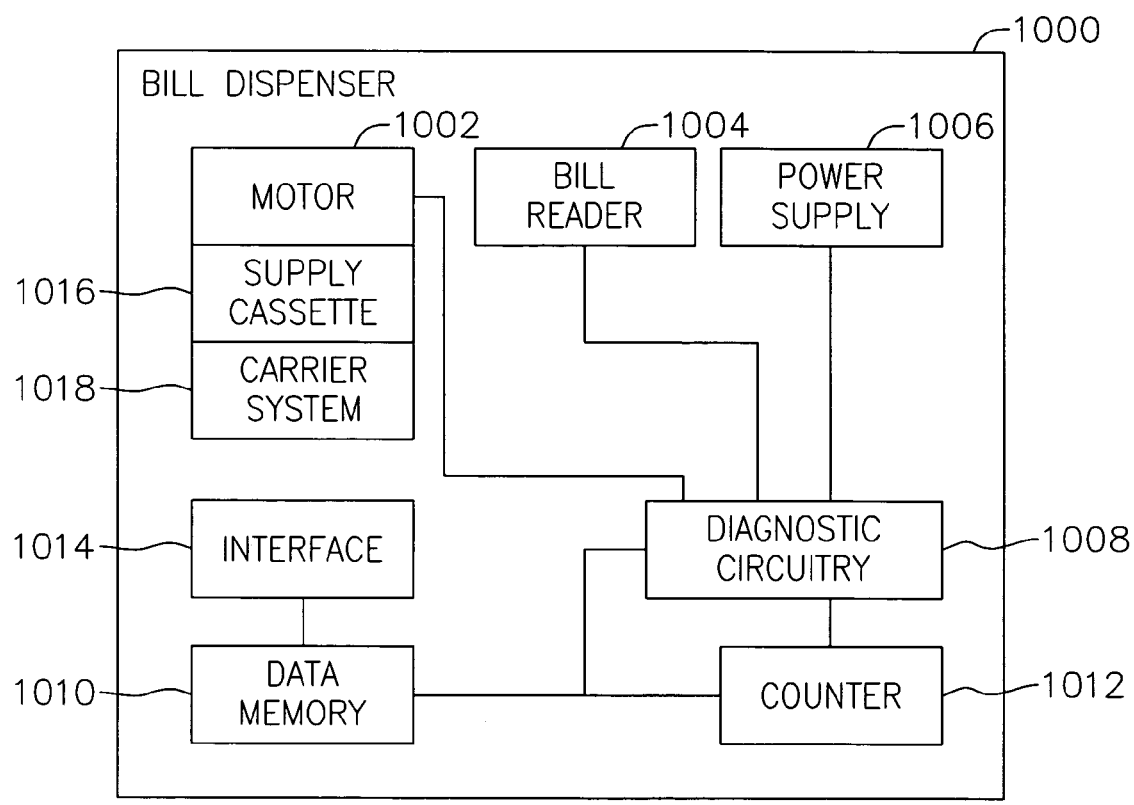
FIG. 10 is a simplified block diagram of one embodiment of a bill dispenser constructed in accordance with the invention.

FIG. 10 depicts one embodiment of a bill dispenser 1000 constructed according to the invention. The bill dispenser 1000 includes currency scanning components with one or more motors (represented by motor 1002) for one or more currency supply cassettes (represented by supply cassette 1016) and a currency carrier system 1018, a bill reader (e.g., one or more sensors that identify the type and denomination of the currency) 1004 and a power supply 1006.

In addition, the bill dispenser 1000 includes diagnostic circuitry 1008 that tracks the operation of the other components. For example, interface circuits connect the diagnostic circuitry 1008 to the motor 1002, supply cassette 1016, carrier system 1018, bill reader 1004 and power supply 1006 to monitor signals that may be processed to determine the usage of these components. These signals may be monitored, for example, using one or more sensors (not shown) located in or associated with these components. Usage may include, for example, the number of times the motor 1002 or the bill reader 1004 has been activated and the total number of hours each of these components has been used. The diagnostic circuitry 1008 may operate in conjunction with circuitry (e.g., one or more counters as represented by counter 1012) to generate usage data indicative of this usage and to store the usage data in one or more data memories (represented by counter 1010).

The bill dispenser 1000 also includes diagnostic circuitry 1008 that may test the operation of the components in the bill dispenser 1000. The diagnostics circuitry 1008 also includes circuitry to generate test result data associated with these tests and store the test result data in the data memory 1010. The test result data may include PASS/FAIL results of tests on the operational status of the bill dispenser's components including ROM, EEPROM, external RAM and internal RAM (not shown). In addition, the test result data may indicate the PASS/FAIL operational status of the bill dispenser's motor or reader. Also, data related to the operating life of the bill dispenser 1000 and/or its components (e.g., 80% of operating life used) may be stored in the data memory 1010.

Other types of status information that may be stored in the data memory include, for example, whether the motor 1002 is powered on, the communication error rate, the number of changes in cassette status, the number of errors detected and information related to verification of bill length and thickness.

The data memory 1010 also may store configuration information. Configuration information may include, for example, a serial number, a model number, the version of the firmware for the bill dispenser 1000, the configuration of the bill dispenser 1000 (e.g., whether foreign currency is supported), bill information (e.g., length and thickness) settings, and the type of communications interface (e.g., RS-232). The configuration information may be used, for example, to enable a diagnostic application or personnel to unambiguously identify the bill dispenser 1000 for asset tracking and identify the installation date or repair history of the bill dispenser 1000.

The configuration information may be stored in the data memory 1010 at various times. For example, the information may be stored when the bill dispenser is constructed or, through the use of an appropriate utility program, at some other time. In addition, the information may be set by the bill dispenser 1000.

Typically, the data memory 1010 is implemented as a non-volatile data memory so that the usage information is not lost when the bill dispenser is not powered. Thus, if the bill dispenser is moved from one POS device to another, the data in the data memory will be maintained. In this way, the configuration and status of the bill dispenser may be accurately tracked throughout its operating life.

The bill dispenser 1000 also includes an interface 1014 (e.g., line interface 416) that enables the information stored in the data memory to be sent to an external component such as a component of the POS device. This information may be sent, for example, in response to a command from the POS device or a management system or sent automatically by the bill dispenser, for example, as a result of a diagnostic test.

The interface 1014 also may be used to enable the bill dispenser 1000 or components in the bill dispenser 1000 to communicate with external components. For example, an application executing on a POS terminal may send commands to the bill dispenser 1000 via the interface 1014 to initiate diagnostic routines. In addition, the diagnostic circuitry 1008 may use the interface 1014 to report the results of diagnostic routines.

Figure 11:
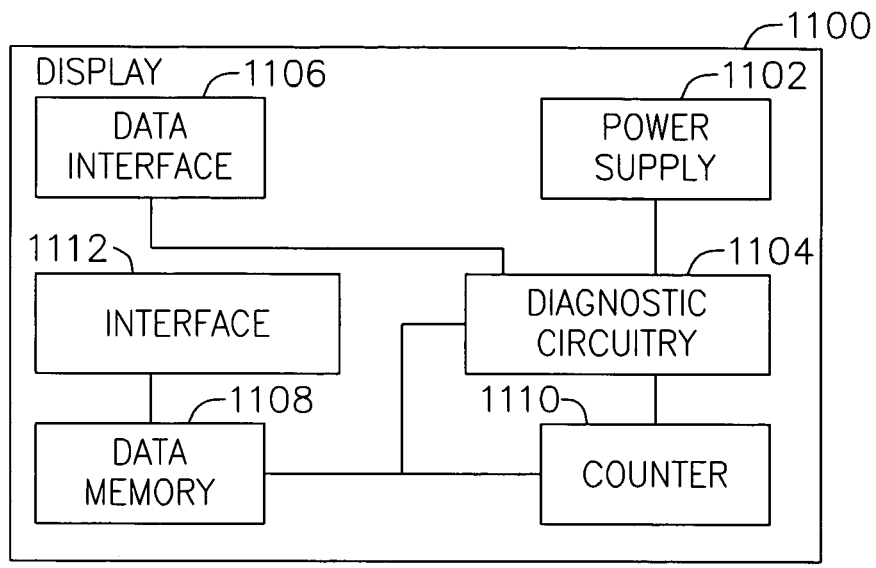
FIG. 11 is a simplified block diagram of one embodiment of a display constructed in accordance with the invention.

FIG. 11 depicts one embodiment of a display 1100 constructed according to the invention. The display 1100 depicted in FIG. 11 may represent either a customer display or an operator display. The display 1100 includes typical display components such as a power supply 1102 and a data interface 1106.

The display 1100 also includes diagnostic circuitry 1104 that can track the operation of these components. For example, interface circuits connect the diagnostic circuitry 1104 to the data interface 1106 and the power supply 1102 to monitor signals that may be processed to determine the usage of these components. These signals may be monitored, for example, using one or more sensors (not shown) located in or associated with these components. Usage may include, for example, the number of hours the display 1100 has been powered on, the communication error rate (e.g., failure percentage) and the date the last character was downloaded to the display 1100. The diagnostic circuitry 1104 may operate in conjunction with circuitry (e.g., one or more counters as represented by counter 1110) to generate usage data indicative of this usage and to store the usage data in one or more data memories (represented by data memory 1108).

The display 1100 also includes diagnostic circuitry 1104 that may test the operation of the components in the display 1100. The diagnostics circuitry 1100 also includes circuitry to generate test result data associated with these tests and to store the test result data in the data memory 1108. This test result data may include PASS/FAIL results of tests on the operational status of the internal components of the display 1100.

The data memory 1108 also may store configuration information. Configuration information may include, for example, the type of display (e.g., model number), serial number, date of manufacture, version of the firmware and operating mode (e.g., type of command set). The configuration information may be used, for example, to enable a diagnostic application or personnel to unambiguously identify the display 1100 for asset tracking and identify the installation date or repair history of the display 1100.

The configuration information may be stored in the data memory 1108 at various times. For example, the information may be stored when the display 1100 is constructed or, through the use of an appropriate utility program, at some other time. In addition, the information may be set by the display 1100.

Typically, the data memory 1108 is implemented as a non-volatile data memory so that the usage information is not lost when the display 1100 is not powered. Thus, if the display 1100 is moved from one POS device to another, the data in the data memory 1108 will be maintained. In this way, the configuration and status of the display 1100 may be accurately tracked throughout its operating life.

The display 1100 also includes an interface 1112 (e.g., line interface 416) that enables the information stored in the data memory 1108 to be sent to an external component. This information may be sent in response to a command from the POS device or a management system or sent automatically by the display, for example, as a result of a diagnostic test.

The interface 1112 also may be used to enable the components in the display 1100 to communicate with external components. For example, an application executing on a POS terminal may send commands to the display 1100 via the interface 1112 to initiate diagnostic routines. In addition, the diagnostic circuitry 1104 may use the interface 1112 to report the results of diagnostic routines.

Figure 12:
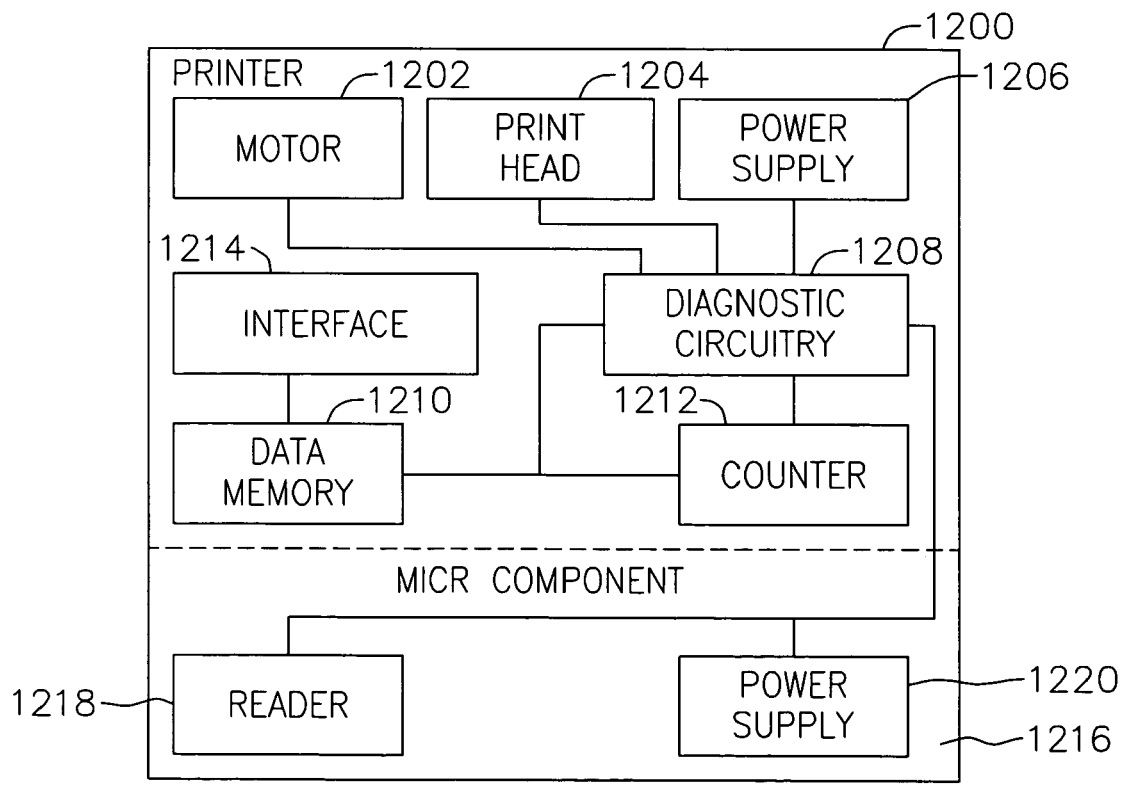
FIG. 12 is a simplified block diagram of one embodiment of a printer constructed in accordance with the invention.

FIG. 12 depicts one embodiment of a printer 1200 constructed according to the invention. The printer may print, for example, receipts, slips and checks (e.g., when MICR printing is supported). The printer 1200 includes standard printer components with one or more motors (represented by motor 1202), one or more print heads (represented by print head 1204) and a power supply 1206, and may optionally include other components such as an MICR component 1216.

In addition, the printer 1200 includes diagnostic circuitry 1208 that can track the operation of these components. For example, interface circuits connect the diagnostic circuitry 1208 to the motor 1202, print head 1204 and power supply 1206 to monitor signals that may be processed to determine the usage of these components. These signals may be monitored, for example, using one or more sensors (not shown) located in or associated with these components. Usage may include, for example, the number of times the motor 1202 or the print head 1204 has been activated and the total number of hours each of these components has been used. For the MICR component 1216, usage may include, for example, the number of MICR reads. The diagnostic circuitry 1208 includes circuitry (e.g., one or more counters as represented by counter 1212) to generate usage data indicative of this usage and to store the usage data in one or more data memories (represented by data memory 1210).

The printer 1200 also includes diagnostic circuitry 1208 that may test the operation of the components in the printer 1200. The diagnostics circuitry 1208 also includes circuitry to generate test result data associated with these tests and to store the test result data in the data memory 1210. The test result data may include PASS/FAIL results of tests on the operational status of the printer's components. In addition, the test result data may indicate the PASS/FAIL operational status of the printer's motor 1202. Also, data related to the operating life (e.g., 80% of operating life used) of the printer 1200, its components and/or its consumables may be stored in the data memory 1210.

In an embodiment where the printer 120 includes an MICR component 1216, the test result data may include PASS/FAIL results of tests on the operational status of the internal components of the MICR component 1216 such as its reader 1218 and power supply 1220. Also, data related to the expected operating life of the MICR component 1216 (e.g., 80% of operating life used) may be stored in the data memory 1210.

Other types of status information that may be stored in the data memory include, for example, the number of roll line feed; the number of times the roll head is energized; the number of slip line feeds; the number of slip characters printed; the number of autocutter operations; the number of lines printed on the back of slip; and the number of printed characters on the back of slip.

The data memory 1210 also may store configuration information. Configuration information may include, for example, a serial number, a model number, the version of the firmware for the printer, whether the motor is powered on, the configuration of the printer and the type of interface (e.g., USB). The configuration information may be used, for example, to enable a diagnostic application or personnel to unambiguously identify the printer 1200 for asset tracking and identify the installation date or repair history of the printer 1200.

The configuration information may be stored in the data memory 1200 at various times. For example, the information may be stored when the printer is constructed or, through the use of an appropriate utility program, at some other time. In addition, the information may be set by the printer 1200.

Typically, the data memory 1210 is implemented as a non-volatile data memory so that the usage information is not lost when the printer 1200 is not powered. Thus, if the printer is moved from one POS device to another, the data in the data memory will be maintained. In this way, the configuration and status of the printer 1200 may be accurately tracked throughout its operating life.

The printer 1200 also includes an interface 1214 (e.g., line interface 416) that enables the information stored in the data memory 1210 to be sent to an external device. This information may be sent, for example, in response to a command from the POS device or a management system or sent automatically by the printer 1200, for example, as a result of a diagnostic test.

The interface 1214 also may be used to enable the components in the printer 1200 to communicate with external components. For example, an application executing on a POS terminal may send commands to the printer 1200 via the interface 1214 to initiate diagnostic routines. In addition, the diagnostic circuitry 1208 may use the interface 1214 to report the results of diagnostic routines.

Figure 13:
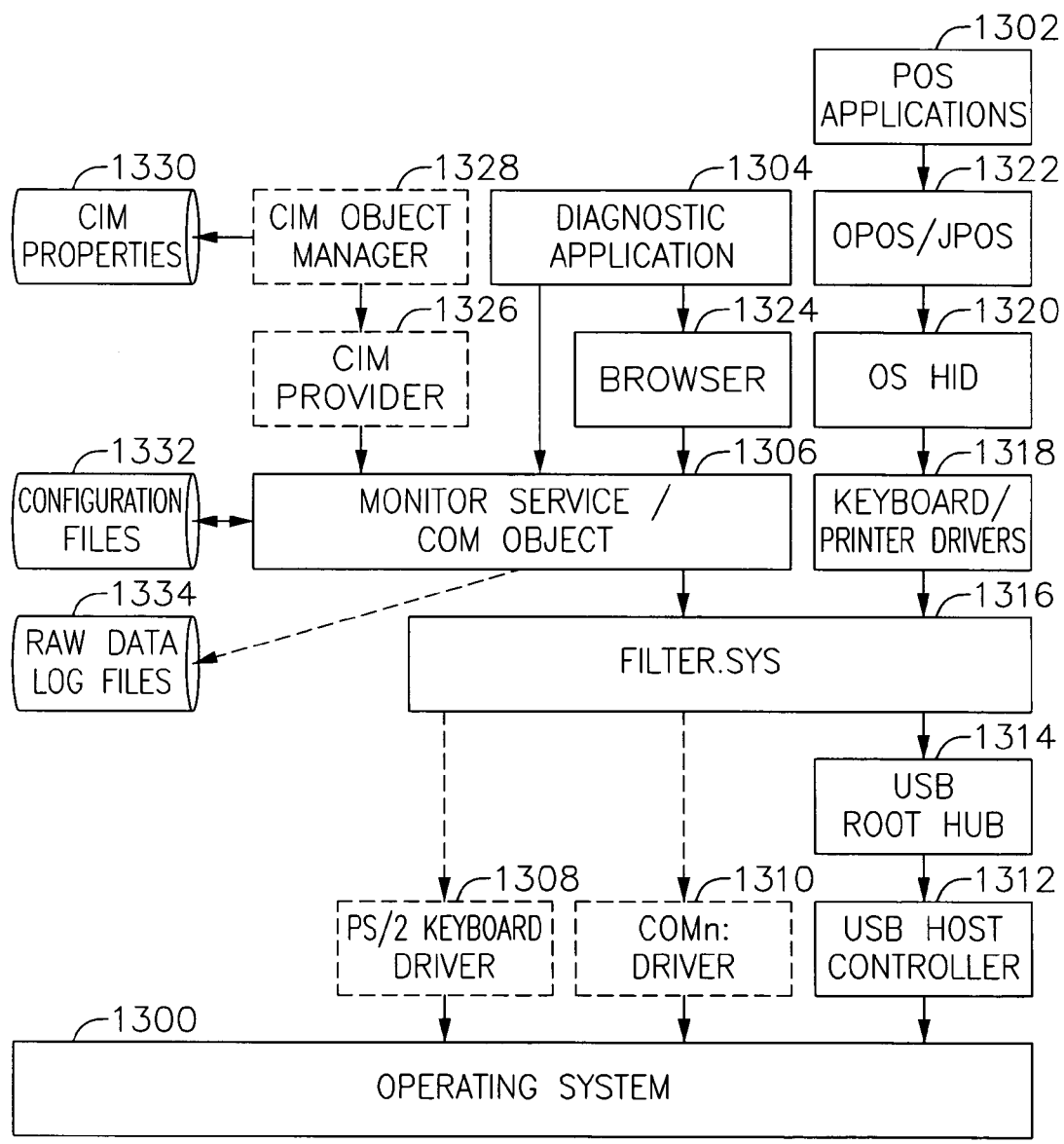
FIG. 13 is a simplified block diagram of one example of high level data flow in one embodiment of a POS device constructed in accordance with the invention.

Referring now to FIG. 13, one example of high level data flow in one embodiment of a POS device will be treated in detail.

POS applications 1302 communicate with POS peripherals (not shown) via an operating system 1300. The communications to and from the POS applications 1302 may be handled by OPOS/JPOS 1322, operating system HID 1320 and drivers 1318.

Associated with the operating system 1300 are several drivers 1308 and 1310 and one or more driver filters 1316. The PS/2 keyboard driver 1308 handles communications with keyboards connected to the POS device via a PS/2 interface. A USB root hub 1314 and USB host controller 1312 handles communications with POS peripherals connected to the POS device via a USB interface.

A monitor service application 1306 interacts with the driver filter 1316 to collect command and response messages associated with the POS peripherals. Initially, this information is stored in raw data log files 1334.

A monitor application 1306 processes the raw data and stores it as CIM Properties 1330. In cooperation with CIM Object Manager 1328, the CIM Provider 1326 enables management tools (not shown) to access the CIM Properties 1330.

A diagnostic application 1304 also interacts with the monitor service 1306 as discussed herein. A browser application 1324 may be used to provide an operator interface for the diagnostic application 1304. In one embodiment, the browser 1324 is based on Microsoft Internet Explorer®.

Prior to discussing the operation of the components of FIG. 13 in detail, several examples of information that may be maintained by the system will be discussed.

1. Configuration Information

Before the system begins full operation several of the system components are configured using configuration information that is stored in one or more configuration files 1332. Configuration information may be stored in simple ASCII line oriented files. These files may be semantically organized along the lines of the INI files.

A configuration file for the diagnostic application ("DA") 1304 may, for example, contain the following items:

| Section | Name | Value | Default |
|---------|------|-------|---------|
| [DA] | Logo | <Path> | "Graphics\Logo.gif" |
| | FRU0 | <Device Name> | "" (Reserved) |
| | FRU1 | <Device Name> | "" (Printer) |
| | FRU2 | <Device Name> | "" (Keyboard) |
| | FRU3 | <Device Name> | "" (Reserved) |
| | FRU4 | <Device Name> | "" (VFD) |
| | FRU5 | <Device Name> | "PC" |
| | FRU6 | <Device Name> | "" (Cash Drawer) |
| | FRU7 | <Device Name> | "" (Reserved) |
| | FRU8 | <Device Name> | "" (Reserved) |
| | FRU9 | <Device Name> | "" (Reserved) |
| | FRU10 | <Device Name> | "" (Controller) |
| | FRU11 | <Device Name> | "" (Scanner) |
| | FRU12 | <Device Name> | "" (Scale) |
| | Color Background | <RGB> | "#D4D0C8" |
| | Color Lifetime | <RGB> | "#FFFF00" |
| | Color Maintenance | <RGB> | "#FF8000" |
| | Color Error | <RGB> | "#FF0000" |
| [<Device Name>] | Target | Path | "DA" |
| | Image OK | Path | Required |
| | Image Lifetime | Path | == ImageOK |
| | Image | Path | == ImageOK |

-continued

| Section | Name | Value | Default |
|---------|------|-------|---------|
| | Maintenance | | |
| | Image Error | Path | == ImageOK |
| | Display Name | Text | ==<Device Name> |
| | Script | Path | Required |
| | SubDevice0 | Text | "" |
| | Script0 | Path | Opt based on SubDevice0 |
| | SubDevice1 | Text | "" |
| | Script1 | Path | Opt based on SubDevice1 |
| | SubDevice2 | Text | "" |
| | Script2 | Path | Opt based on SubDevice2 |
| | SubDevice3 | Text | "" |
| | Script3 | Path | Opt based on SubDevice3 |
| | SubDevice4 | Text | "" |
| | Script4 | Path | Opt based on SubDevice4 |
| | SubDevice5 | Text | "" |
| | Script5 | Path | Opt based on SubDevice5 |

All Path type values are either absolute paths (i.e.; start with a drive letter), or paths relative to the installation location of the DA.EXE. The <Device Name> "Target" value is either the constant string "DA" or the name of an external application to be run when the class graphic is clicked, or nothing to invoke the Script parameter. The <Device Name> "Display Name" values are placed on the Tabs of the vertical tab strip on the DA Details dialog when the <Device Name> horizontal tab is selected. The Image Value paths are the paths to the GIF image to display when the device reports being in the associated state (e.g., OK, Lifetime, Maintenance, Error). The Scriptn name/value pairs name the HTML page that is to be used to display the device status and perform the device diagnostics.

One embodiment of a relatively minimal diagnostic application file is:

[Diagnostic Application]
FRU1=Printer
FRU2=Keyboard
FRU5=PC
[PC]
Target=LanDesk exe
[Printer]
Image OK=Graphics\Printer.gif
Script=Scripts\ Printer.html
SubDevice0=Receipt Printer
Script0=Scripts\ Printer \Receipt.html
SubDevice1=Slip Printer
Script1=Scripts\ Printer \Slip.html
SubDevice2=Check Printer
Script2=Scripts\ Printer \Check.html
SubDevice3=MICR Reader
Script3=Scripts\ Printer \MICR.html
[Keyboard]
Image OK=Graphics\Keyboard.gif
Script=Scripts\ Keyboard.html
SubDevice0=Keyboard
Script0=Scripts\ Keyboard \Keyboard.html
SubDevice1=Key Lock
Script1=Scripts\ Keyboard \Key Lock.html
SubDevice2=MSR
Script2=Scripts\ Keyboard \MSR.html
SubDevice3 =Beeper
Script3=Scripts\ Keyboard \Beeper.html A configuration file for the monitor application 806 may contain the following items:

| Section | Name | Value |
|---------|------|-------|
| [TERMINAL] | ID | Text. The terminal's uniquely identifying string. This could be the serial number or the MAC address of the terminal |
| | Stream Flush Interval | Integer. The time in seconds between successive disk updates of the Stream Log files. A value of 0 indicates to write as often as needed, while a value of −1 indicates that data is RAM only. |
| | Data Flush Interval | Integer. The time in seconds between successive disk updates of the Statistics files. A value of 0 indicates to write as often as needed, while a value of −1 indicates that data is RAM only. |
| | Filter Driver | Device name of the driver supplying the data stream |
| | Filter Driver Parms | Parameter string for the filter driver's initialization |
| | Expected Devices | A comma separated list of the Devices (<Device ID>) pre-configured for this terminal. The Device Statistics of each will be preloaded. |
| [<Device ID>] | Device Name | Text. This parameter provides the name of the device class as known at the COM user (DA) level. |
| | Stream Interpreter | Path & Name of the DLL containing the stream interpreter |
| | Log File Size | Integer. Maximum number of bytes in the (circular) log file |

There is one [<Device ID>] section for every device that is being monitored. The stream interpreter (discussed below) is configured to recognize the sub-devices of a supported device.

A Total Cost of Ownership ("TCO") configuration file includes all of the TCO specific configurable items. Typically, a user or field technician will not alter this file and it is not directly available for editing from the diagnostic application.

| Section | Name | Default |
|---------|------|---------|
| [<Device ID>] | TCO1 Display Name | "" Display name for TCO Counter 1 at the DA |
| | TCO1 Maintenance Threshold | The threshold value for declaring that maintenance is required based on TCO counter 1 |
| | TCO1 Maintenance Advice | Maintenance text to display when threshold 1 is exceeded. |
| | TCO1 Lifetime Threshold | The threshold value for declaring that the lifetime maintenance event is required based on TCO counter 1 |
| | TCO1 Lifetime Advice | Lifetime text to display when threshold 1 is exceeded. |
| | TCOn Display Name | "" Display name for TCO Counter n at the DA |
| | TCOn Maintenance Threshold | The threshold value for declaring that maintenance is required based on TCO counter n |
| | TCOn Maintenance Advice | Maintenance text to display when threshold n is exceeded. |

-continued

| Section | Name | Default |
|---|---|---|
| | TCOn Lifetime Threshold | The threshold value for declaring that the lifetime maintenance event is required based on TCO counter n |
| | TCOn Lifetime Advice | Lifetime text to display when threshold n is exceeded. |

2. Statistics Information

Distinct POS peripheral statistics may be maintained by using the serial number of the POS peripheral as a unique identifier. The following statistics may be collected for every device (e.g., POS peripheral) and stored in the log files:

| Name | Description |
|---|---|
| Identifier | The device's serial number. For USB devices, this value may be formed by concatenating the 4 hex digits (with leading zeroes) of the Vendor, Product and Device USB Description fields. |
| Firmware Version | The Firmware identification string, as reported by the device. Note that this might be empty until after the DA has been run against the device |
| PDOName | The Name of the Physical Device Object (PDO) being monitored. |
| Enumerator | The Name of the PNP bus which has discovered (enumerated) the device |
| Discovery | The date/time that this device's serial number was first detected on this terminal |
| LastUse | The date/time of the last instance that a command was sent to or response received from the device |
| MonitorTime | The length of time (in minutes) that this device has been monitored |
| LastError | The last error condition detected by the monitor |
| LastErrorDT | Date and time of the last error |
| ErrorFIFO | The last n error conditions detected by the monitor |
| ErrorFIFODT | Date and time of the errors in the FIFO |
| LastStatus | The last status condition detected by the monitor |
| LastStatusDT | Date and time of the last status |
| StatusFIFO | The last n status conditions detected by the monitor |
| StatusFIFODT | Date and time of the status values in the FIFO |
| File Overrun | The number of times that the Monitor was not able to log the data stream because the Flush Interval was too long. |
| Commands | The number of command messages sent to the device by the upper levels |
| Responses | The number of response messages sent to the upper levels by the device. Note that there may not be a direct one-for-one correspondence between commands and responses |
| Error Responses | The number of device responses that indicate an error condition |
| Device Cycles | The number of operational cycles taken by the device, as determined by the stream interpreter. |
| Configuration | Device specific. Contains the Current Configuration data. |
| Current State | Device Specific. Contains the Current State information |
| TCO Counters | Device Specific: Contains the Current TCO counters |
| CIM Events | Device Specific: Contains the current CIM Event descriptions |

3. Raw Log Information

One embodiment of a format of the raw log data when transmitted to the remote management tool follows.

| Field Number | Description |
|---|---|
| | Length. The number of 8-bit bytes in the Message Data record following. (This does not include these header fields.) |
| | USB Vendor Identification number |
| | USB Product Identification number |
| | USB Product Version number |
| | Type of data:<br>0 == File Overrun<br>1 == USB recognizes new device<br>2 == USB removes an existing device<br>3 == ReadFile( )<br>4 == WriteFile( )<br>5 == URB Input<br>6 == URB Output<br>7 == Other Output |
| | Time stamp. From the system KeQuerySystemTime( ) function. |
| | Message data |

Turning now to the operation of the diagnostic application 1304 of FIG. 13, the diagnostic application 1304 may have two different feature sets. In one mode, the diagnostic application may provide "confidence" as to the operating condition of the POS device. Thus, it may be used to help isolate errors and suggest corrections. In the other mode, the diagnostic application will interface with the monitor service 1306 to process a POS peripheral's history. This historical viewpoint may be used to improve the diagnostic capabilities of the management tools. Thus, the diagnostic application may provide diagnostic hints to an on-site service person based on the observed operation of the device and its history as derived from the monitor service 1306.

As discussed above, the diagnostic application 1304 communicates with the monitor service 1306 to take advantage of the collected information. In one embodiment, the diagnostic application 1304 communicates via a socket interface, as does the remote manager (FIG. 2). One difference here is that the diagnostic application 1304 typically executes in the same machine as the CIM Provider 1326. Thus, the diagnostic application may construct GET and SET messages to retrieve information or to instruct the monitor service 1306 to perform an activity.

The monitor service 1306 maintains a log that contains a record of all activities performed with the POS peripherals. Entries to the log are made for both conditions detected/reported by the diagnostic application and for commands/operations requested by, for example, a user. All log entries have a timestamp.

In addition, the operating system 1300 maintains an event log that may be used to record detected error conditions. Use of the event log might allow a simplified CIM Event generation to be performed based on event log activities.

The informational codes (e.g., status codes) maintained by the system may include, for example, Device Detected, Device Removed, Serial Number Reported, Firmware Version Reported, Device Off-line, Device On-Line, DA Run against Device, Internal Counters Initialized and Device Reset.

The error codes maintained by the system may include, for example, Basic Assurance Test (BAT) Failure, Device Overrun Autocutter Error, Home Position Error, Carriage Movement Error, Receipt Cover open error, Slip Ejection Error, Voltage Error, CPU Error, Circuit Error, Out of Paper, Paper Jam, MICR Read Error and Magnetic Stripe Read Error.

The management information base 1330 data items that may be retrieved by the remote management tools may include, for example:

Object
  System Identifier
    Configuration Data
System Name
  Retail I/O
    Fans (CPU, Chassis, PSU)
    Power Supplies
    Batteries
    CMOS
    Type of Keyboard
    Type of Display
    Type of Scanner
    Type of Printer
    Magnetic Stripe Reader
    Cash Drawer(s)
    (For each device above, as appropriate)
      Device ID (serial #)
      Firmware Version
      Device Configuration
      Last Error Code
    Last Error Date/time
    Error FIFO
    Error FIFO Date/time
    Last Status
    Last Status Date/time
    Status FIFO
    Status FIFO Date/time
    Last Use
    Discovery
  Object
    File Overrun
    Commands
    Responses
    Error Responses
    Device Cycles
    Raw Data
    DA determined status
    (Repeat the following as needed)
    Trap Error Code
    Trap Error Velocity (n)
    Trap Error Velocity (d)
    Trap Error Gate
  Generic Device Names
    Slip Printer
    Check Printer
    Receipt Printer
    MICR reader
    Cash Drawer 1
    Cash Drawer 2
    Scanner
    Scale
    Keyboard
    POS Key
    Key Lock
    VFD
    MSR
    Controller
    PC Errors and Status objects have "FIFO" values. That is, they contain the N most recent status or error codes. Error FREQUENCY is a measure of how often an error occurs. It will be stated as a fraction formed by two integers (n/d): if the associated error code occurs more often than n times in the last d commands, then a trap will be generated. The Trap Error Gate will be closed (true) after an error has been trapped. Trap gates will be re-opened after a system reboot, the operation of the diagnostic application or via command from the remote manager.

Figure 14:
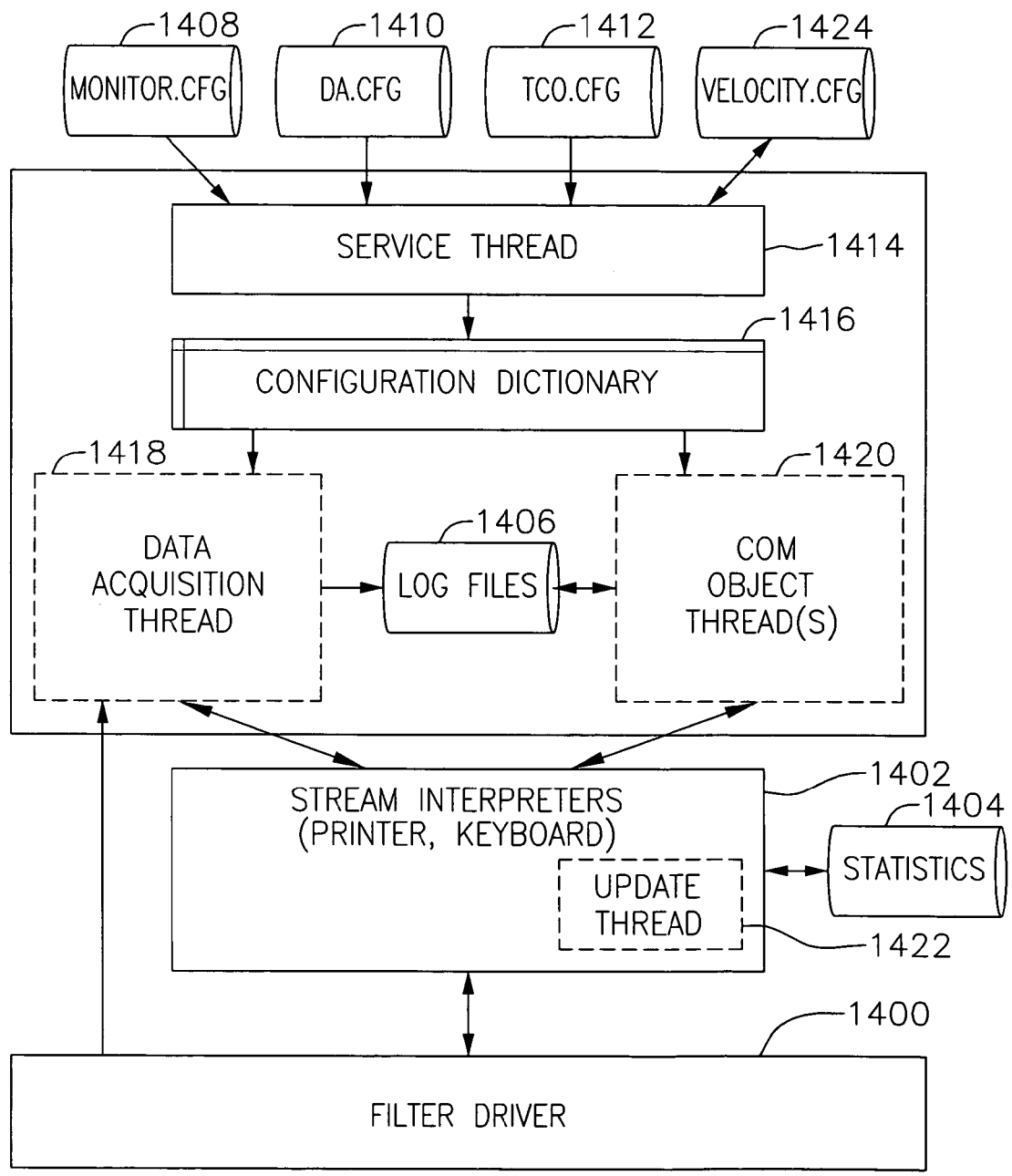
FIG. 14 is a simplified block diagram of one example of monitor internal data flow in one embodiment of a POS device constructed in accordance with the invention.

Referring to FIG. 14, one example of data flow for a monitor application in one embodiment of a POS device will be discussed. As discussed above, a filter driver 1400 provides the initial input data stream. Stream interpreters (e.g., for the printer and keyboard ports) and data acquisition threads 1418 may process the input stream to parse out selected data and store the data in log files 1406. Statistics 1404 may be maintained in conjunction with the stream interpreters 1402.

Configuration information for the process is provided by a monitor configuration file 1408, a diagnostic application configuration file 1410, a TCO configuration file 1412, and a velocity configuration file 1424. This configuration information is processed by a service thread 1414 that provides the configuration information to the monitor via a configuration dictionary 1416.

In this embodiment, the monitor application is implemented as a COM object 1420. This COM object presents an interface that can be utilized by both a VB User Interface framework and by HTML scripts. It is instantiated during startup as a service. The following sets forth one example of the properties and methods exposed by the object.

In the examples that follow the Device Identification Code (DevID) is a string that uniquely identifies a device attached to the terminal. For USB devices, the string is generated by the filter driver by concatenating the hex representation of three pieces of data supplied by the USB interface: idVendor, idProduct and bcdDevice. For non-USB devices, the string will be the Physical Device Object Name after stripping the leading "\Device\" that is common to all names.

After creation of the monitor object, the client code invokes the SelectDevice( ) method prior to any other usage. This associates the object to a device (e.g., POS peripheral) that is being monitored.

Monitor Properties

Examples of properties that may be associated with the monitor follow:

1. ConfigItem. All configuration file data is available to any component using this property.

Inputs are keys that are constructed by taking the configuration file generic name adding a period, adding the section name adding a period and then the field name. For example: ConfigureItem("Monitor.Terminal.ID").

The output is the ASCII value of the item.

2. DeviceFromIdentification. The DeviceInformation is a 12 digit string: VVVVPPPPDDDD, where "VVVV" is the idVendor, "PPPP" is the idProduct and "DDDD" is the bcdDevice, all from the USB Device Information structure.

The input is DeviceInformation. The (USB) Identification information for the device desired. This string may come from the DeviceAppearance event.

The output is the ASCII name of the device that instantiates this class on this terminal.

3. Status. This method retrieves the status of the device. Status is the (relatively) non-volatile description of the device that is commonly used to populate the "Status.html" display page. Values are specified as Name/Value strings.

The following Names are returned:

| Code | Last reported status/error code |
|---|---|
| Status | Operational status: "OK" or other |
| Serial | Serial number |
| FWver | Firmware Version Number |
| OpTime | Time in Operation |
| Interface | Physical interface connection |
| ID | Identification string |

4. Configuration. This method retrieves the current configuration of the device. Values are specified as Name/Value strings, and are specific to the particular device. Often they will include the values of configuration switches and internal settings.

5. State. This method outputs the available device State. Device State is volatile and device specific. State will be represented as a Name/Value string. The labels correspond to each different maintained statistic, and the value is the current value of the statistic.

6. Errors. This method outputs the available device Errors.

The input is the type of Error data desired: Either "FIFO" for the list of most recently reported conditions, or "ARRAY" for the array of all error codes.

Errors will be represented as a Name/Value string. The Names are the error code numbers. For ARRAY data, the values are the counters of the number of occurrences. Integer values will be represented as base 10. For FIFO data, the values are the date and time of occurrence.

7. TCO. This method outputs the available device Total Cost of Ownership counters. They will be represented as a Name/Value string. The names correspond to each different counter's external (Display) name, and the value is the current value of the counter.

8. CIM. This method outputs the available device CIM Properties. They will be represented as a Name/Value string. The names correspond to each different counter's external (Display) name, and the value is the current value of the counter.

9. DeviceDataStream. This method outputs the actual bytes of the stream as discussed below or an Empty string if there is no more data. The string is presented in three comma-separated parts: <Time Stamp>, <Direction>, <Data>.

10. DipSwitches. This method outputs the status of the defined DIP switches used for configuration. If the device does not support DIP switch configuration, then the return string will be empty. The switch numbering is often in the format "n-m" where n is the switch bank number and m is the switch within the bank. The switches can also represent software settings.

11. Results. This property is intended for use after executing the SendDeviceCommand( ) procedure to cause the device to perform some action. The data returned is determined by the requested data type.

The input is Set to indicate the data type desired:
1=localBuffer. Contents depend on last command
2=User Input. Contents depend on user action.
3=Keylock state.
4=MSR data.

The output is the actual bytes of the requested result.

12. ReloadConfiguration. If set to true, then the next time the Monitor object is instantiated, the configuration files will be reloaded. After reload, the value is set false. When used to read the property, it returns the current setting of the data.

Monitor Properties

Examples of methods that may be associated with the monitor follow:

1. SelectDevice. All properties and methods will now operate against the selected device. This method is invoked prior to any other method or property.

The input is the name of the device being commanded. The name is often provided by DeviceFromIdentification( ). The Name can be either:

DevID—Selecting the currently active device with this id;

DevID.Serial—Selecting the specific device, whether or not it is connected; or

Generic—Selecting the first active device of this type.

2. SendDeviceCommand. The text of the command is sent to the named device via the filter driver. All of OPOS (if in use) is bypassed. The response (if any) to the command will go as far "upstream" as the current status of the channel warrants. The filter driver and monitor will see the response. The effect of the command can be determined by invoking other monitor methods. If OPOS is running, it will see the response even though it didn't send the command.

The input is the (binary) command to be sent to the device. Note there is no translation or other assistance: the command must be completely and properly formed.

3. PurgeLogFiles. The log files will be emptied. This is the same effect as retrieving all of the raw data, but without the overhead of actually passing all of the data around. This command has no effect on the size of the log file on disk.

4. ResetTCOCounters. All re-settable TCO counters on the device will be zeroed. Note that some devices may not have any re-settable counters.

The input is the type of counter to reset: Errors, Status or History.

Monitor Events

Examples of events that may be associated with the monitor follow. These describe the event handling procedure within the monitor application user code. What is described as an input is actually the output from the monitor.

1. DeviceAppearance. The application will perform any necessary adjustments to the display to indicate the new device. The format of the identification string is VVVVP-PPPDDDD. The notation is leading zero hex concatenation of the idVendor, idProduct and bcdDevice USB description fields.

The input is the identification string provided by the device that has appeared. This data comes from the registry and the USB information.

2. DeviceRemoval. The application will perform any necessary adjustments to the display to indicate the new device.

The input is the identification string provided by the device that has just been removed from the system.

3. StateChange. The application will perform any necessary adjustments to the display to indicate the new device.

The input is the identification string provided by the device that has just changed state.

4. ErrorDetected. The application will perform any necessary adjustments to the display to indicate the new device.

The input is the identification string provided by the device that has just recorded an error.

5. Lifetime. The application will perform any necessary adjustments to the display to indicate the new device. Lifetime events occur when a lifetime TCO counter is exceeded. The moment that a counter has been exceeded is not necessarily immediately detected. Lifetime counters that are maintained by the device itself are not routinely retrieved and tested. Ordinarily a diagnostic application operation is required.

The input is the identification string provided by the device that has just experienced a lifetime TCO event.

6. Maintenance. The application will perform any necessary adjustments to the display to indicate the new device. Maintenance TCO events are usually raised either when a maintenance counter has been exceeded or cleared (reset to zero). The moment that a counter has been exceeded is not necessarily immediately detected. Maintenance counters that are maintained by the device itself are not routinely retrieved and tested. Ordinarily a diagnostic application operation is required.

The input is the identification string provided by the device that has just encountered a TCO Maintenance event.

The monitor application interfaces to the filter driver and presents a COM interface. The COM interface internals insure that data structures are being accessed in a single-threaded mode. The interface to the filter driver is via a circular buffer. The filter driver inserts data into the buffer and data stream threads process and removes data from the buffer. The data stream threads run at a low priority to avoid degrading the performance of the main POS applications.

The Serial data stream may be monitored using an Upper Filter for SERENUM. This allows the driver to inspect every IoRP sent to the driver, giving it the opportunity to capture both commands and responses.

In one embodiment, the driver is written so that it does not block or delay the execution of the main data flow. This may require the use of memory buffers. The memory buffers are implemented as circular buffers, and shed data rather than impede system performance. Buffer overrun events will be noted in the log.

The filter driver is attached to the various COM devices by means of Registry editing. An installation program will find all COM devices and modify the Upper Filter settings to include this filter driver.

The filter driver also presents an interface to the monitor application that allows the monitor application to retrieve stored raw data via an IOCTL mechanism.

The device data stream runs through buffers which are input via the filter driver and output via the data stream threads. These threads process the data according to the device attached. Context is important, so that the relative placement of input and output messages must be maintained. The interpreters will be "stateful".

The threads invoke the stream interpreter DLLs to perform the actual interpretation of the data. Two examples of stream interpreters 1402 follow; one for a printer and one for a keyboard.

For the printer, the stream interpreter 1402 collects device status, identification information and maintenance information.

Device status includes automatic status back ("ASB") messages and real-time status transmission messages.

Automatic status back is a sequence that is transmitted from the printer to the host asynchronously when a monitored status changes. Status information contained in the ASB sequence may include, for example, whether the printer is online or offline, status of the paper in the printer, whether errors have occurred, the type of error and whether the cover is open.

Real-time status transmission may occur, for example, when a DLE EOT command is detected in the output stream. The byte that is sent in return is a status byte. The meaning of the status byte may include, for example, errors similar to those discussed above for automatic status back and messages relating to problems with the slip of paper in the printer.

Identification information may be obtained when the corresponding command is detected in the output stream. The data seen on the following input stream is interpreted according to the value of a variable n.

| n | | Data |
|---|---|---|
| 1 or 49 | Model ID | 1 byte: == 0x24 |
| 2 or 50 | Type Bit array | 1 byte: See the TYPE ID table following for bit assignments |
| 3 or 51 | Firmware ID | 1 byte: Firmware version ID |
| 65 | Firmware Version | N Bytes: 0x5F, Firmware version, 0x00 |
| 66 | Manufacturer | 7 bytes: 0x5F, "MFG NAME", 0x00 |
| 67 | Printer Name | 10 bytes: 0x5F, "NAME", 0x00 |
| 68 | Serial Number | N Bytes: 0x5F, "SER. NO.", 0x00 |
| 69 | Multilingual | M Bytes: 0x5F, "KANJI JAPANESE" \| "CHINA GB2312" \| . . . , 0x00 |
| 112 | DIP switches | 4 bytes: DIP Switch settings |

One example of a Type ID Table is:

| Bit | Meaning when bit is set |
|---|---|
| 0 | Kanji (2 byte codes) supported |
| 1 | Autocutter installed |
| 2 | DIP sw 2-2 is ON |
| 3 | MICR reader installed |
| 6 | Check (endorsement) printer installed |

Maintenance information may be obtained when a corresponding command is detected in the output sequence. The data seen on the following input stream is interpreted according to a variable n. Each of these entries may have an associated recommendation threshold.

| n | Data |
|---|---|
| 0x0A | Number of Slip line feeds |
| 0x0B | Number of face printed slip characters |
| 0x14 | Number of lines feed Roll |
| 0x15 | Number of times head energized Roll |
| 0x28 | Number of lines printer back of slip |
| 0x29 | Number of printed characters back of slip |
| 0x32 | Number of autocutter operations |
| 0x3C | Number of MICR reads |
| 0x46 | Period of printer operation |
| 0x8A | Cumulative Number of Slip line feeds |
| 0x8B | Cumulative Number of face printed slip characters |
| 0x94 | Cumulative Number of lines feed Roll |
| 0x95 | Cumulative Number of times head energized Roll |
| 0xA8 | Cumulative Number of lines printer back of slip |
| 0xA9 | Cumulative Number of printed characters back of slip |
| 0xB2 | Cumulative Number of autocutter operations |
| 0xBC | Cumulative Number of MICR reads |
| 0xC6 | Cumulative Period of printer operation |

For the keyboard, the stream interpreter 1402 may collect, for example, constant asynchronous codes, scan mode information, key switch position, firmware version, magnetic stripe reader data and maintenance counter information.

For constant asynchronous codes the input data stream is monitored for the following Overrun, Basic Assurance Test failure, and Nak (Resend request) codes (when not inside of an MSR data block).

For scan mode the output data stream is monitored for the presence of certain command codes so that the keyboard's response character set (1 or 2) will be known.

For key switch position, on the output stream, a particular sequence will indicate that a Key Switch response is coming. This response includes the following meanings:
Error Position, Lock, Operate, Manager and Auxiliary.

For firmware version, on the output stream, a particular sequence will indicate that a Firmware Version response is coming. This response may, for example, include the following meanings: Keyboard Type, Firmware version 001 for PS/2 Keyboard, Firmware version 002 for USB Keyboard.

The start of magnetic stripe reader data is indicated by another sequence. This may be followed by the sequence of Track ID, Byte Count and Data. This sequence will be repeated until all of the track data is transmitted. At that time, a Track ID of <ENTER> will be sent. This response includes the following meanings: ISO track 1 data, ISO track 2 data (JIS I track 2 data), ISO track 3 data, JIS II track data and <Enter>==End of Data.

The maintenance counters are referred to as the Total Cost of Ownership (TCO) counters. The commands to access the counters may, for example, include 1) Store TCO values; 2) Read Counter XX (00-29); and 3) Read all Counters. Counter Numbers are assigned to content. Each of these counters may be assigned a threshold that once exceeded triggers a recommendation to take a particular action.

| Counter | Contents |
| --- | --- |
| 0 | All keys |
| 1 | Minutes |
| 2 | MSR Good reads |
| 3 | MSR Bad reads |
| 4 | Keylock |
| 5 | N0 (11) |
| 6 | N1 (35) |
| 7 | N2 (36) |
| 8 | N3 (37) |
| 9 | N4 (38) |
| 10 | N5 (57) |
| 11 | N6 (58) |
| 12 | N7 (77) |
| 13 | N8 (78) |
| 14 | N9 (79) |
| 15 | A (43) |
| 16 | E (66) |
| 17 | Tab (63) |
| 18 | ESC (105) |
| 19 | Enter (55) |
| 20 | Left Shift (21) |
| 21 | Right Shift (33) |
| 22 | Down (9) |
| 23 | Right (10) |
| 24 | OPOS 1 (126) |
| 25 | Free |
| 26 | Free |
| 27 | Free |
| 28 | Free |
| 29 | Free |

There are other TCO values stored in EEPROM that may be read out via a command sequence. These values may include, for example:
Contents
Keyposition to count, 0 End of List
Keyinterval for write back, default 0=10
Max 32 Bytes for Serial Number
Year (4), Month (2), Day (2) of manufacture
Year (4), Month (2), Day (2) of last programming
8 Bytes Firmware Level
Sound Parameter:
E80 UcSoundPoti
E81 ucFreq1
E84 ucVol1
E82 ucFreq2
E85 ucVol2
E83 ucFreq3
E86 ucVol3
MSR-Typ(1)=3
Communication Error rate (2)=0, 0
N-Key Rollover Setting (1)=0

The USB filter driver is designed to not impact POS device performance. It may capture all data sent to or received from a monitored device. However, if the monitor application has not opened the driver then the data stream will be lost.

The filter driver routes the data to the monitor for processing. The filter driver will identify whether the data was written to or read from the device and the time of the capture. The monitor will identify the data source and evaluate the data contents.

The filter typically is a "lower filter", which means that it will be lower in the device stack (closer to the device) than other drivers and filters. The keyboard, for example has a filter driver (FIG. 13) that implements many of the keyboard functions. The diagnostic application filter reads the scan codes from the keyboard prior to any translations that have been configured for the benefit of the POS application.

The filter will implement an I/O interface that allows the monitor to post read commands. These read commands are satisfied with data sent either to or from the monitored device. The read commands specify a buffer and maximum size. The read will be satisfied when the buffer fills. Typically, only complete messages are included in the buffer.

An I/O control ("IOCTL") command is issued by the monitor application that will terminate the current read regardless of buffer full status. This IOCTL is used when the diagnostic application takes control to flush all data into the monitor application.

The data captured by the filter driver is the raw command and response data used to operate the POS peripherals. This data in its raw form may not be suitable for use by remote management tools. Two consecutive processes may be used to transform the data.

First, the monitor application takes the raw data and stores it in a log file. This data is categorized by device and reduced to eliminate redundancy.

Second, the monitor service, when requested by either the diagnostic application or by a remote management tool, will process the log to return concise information. The definition of the concise information is contained Common Information Model (CIM).

The event log discussed above is used to store data until the monitor service can process it. The data is in a relatively raw format, and reduction may be required to effectively process that data.

For other system components, such as the disk and CPU, an application such as LANDesk may be used for monitoring these components. LANDesk (and other applications) use the Common Information Model (CIM) to report results. These results may be integrated with the diagnostic application.

Figure 15:
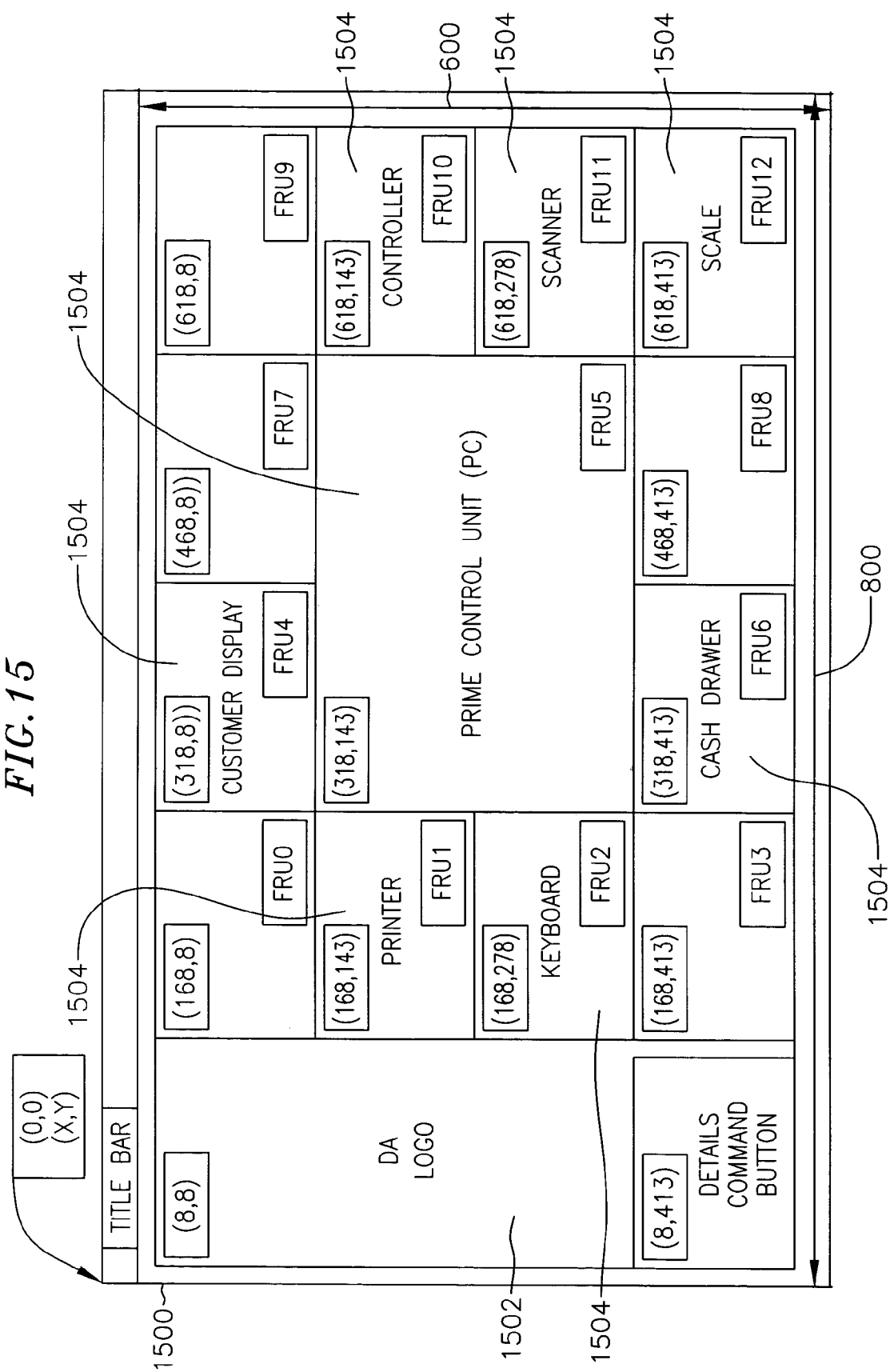
FIG. 15 is a simplified block diagram of one embodiment of an initial display in a POS device constructed in accordance with the invention.
Figure 16:
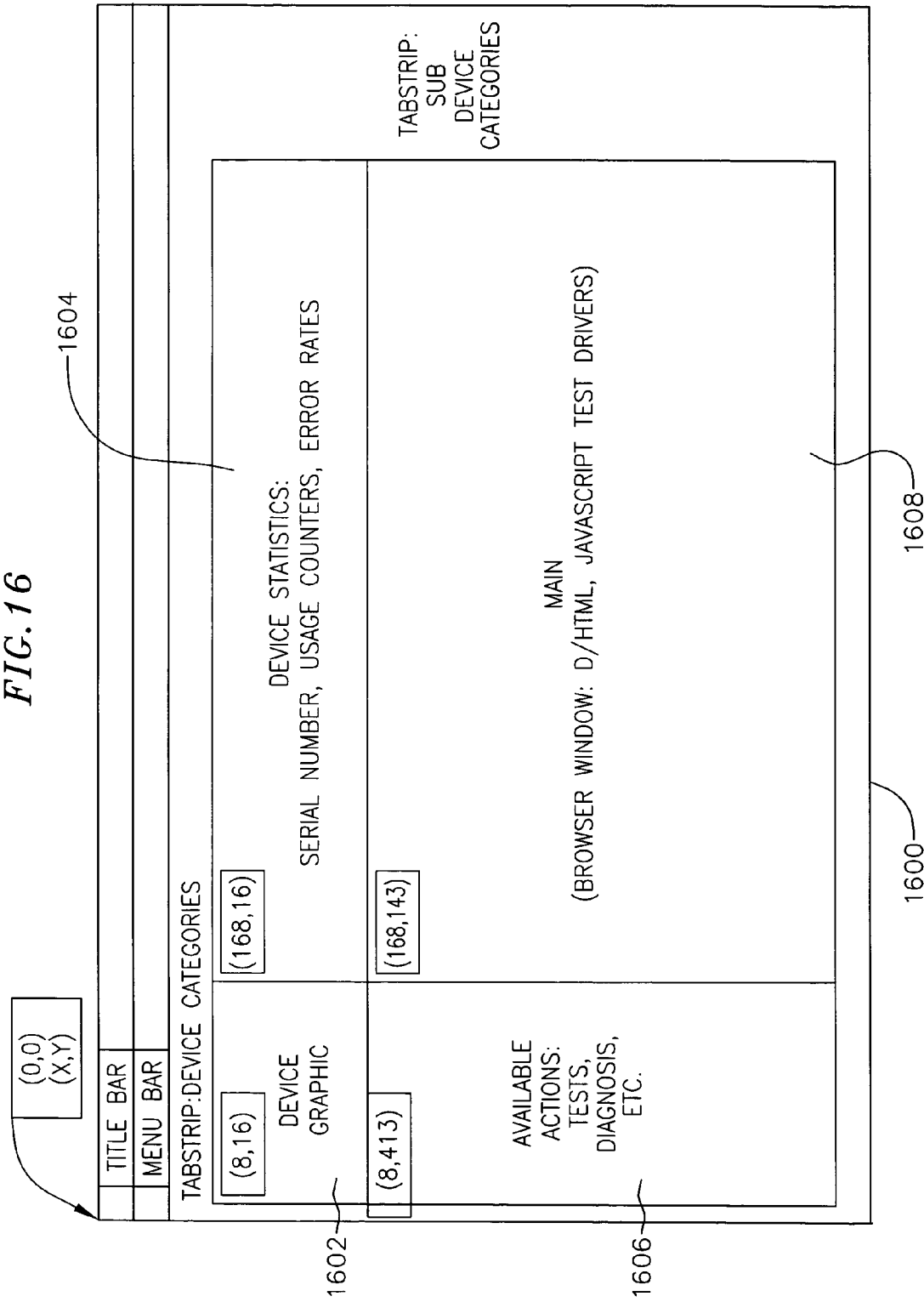
FIG. 16 is a simplified block diagram of one embodiment of a details display in a POS device constructed in accordance with the invention.

FIGS. 15 and 16 depict one example of a user interface presented by the diagnostic application. The graphics used on the opening page 1500 of the diagnostic application include logo images 1502 and device images 1504 as represented by the blocks in FIG. 15. FIG. 16 depicts a details display 1600 that appears when a device image button 1504 is "clicked" using, for example, a pointing device such as a mouse. As shown in FIGS. 15 and 16, the system may provide a single: display that enables an operator to diagnose the components of the personal computer (e.g., the Prime Control unit (PC)) and the POS peripherals (e.g., printer and scanner).

The main background is the standard Button Face color. The device graphics are framed by an area that may be in one of four colors, in order to indicate the status of that Field Replaceable Unit (FRU)/device:

| Status | Color |
|---|---|
| Operational without any condition | Gray |
| Operational with Maintenance due | Orange |
| Operational nearing the end of the rated lifetime | Yellow |
| In error, as detected by the Monitor or the DMI interface | Red |

This section describes tests that may be performed for one embodiment of a printer and a keyboard.

As represented, for example in FIG. 16, the printer HTML screen 1600 is divided into 4 major areas (panels) with a picture (e.g., a graphic image) in the upper left panel 1602. The upper right panel 1604 is intended as a "status zone". For this panel for the printer (when displayed), the system polls the printer at 5 second intervals to retrieve and display the current Serial Number, Firmware Version and Operating time metrics. If there is no printer plugged in, the display indicates this.

Action buttons (not shown) are provided on the lower left panel 1606 and may include, for example, "Summary", "Status", "Configuration" and "Test" actions. When clicked these buttons change the display in the large lower right panel 1608. Clicking the Summary button (default display) may, for example, cause panel 1208 to display the maintenance counters. In a similar manner, the Status display may show the contents of the ASB message in a readable format, refreshed every 5 seconds. This may be used to monitor, for example the status of "printer cover open." The Configuration button may display the DIP Switch settings with legends at a 5 second refresh rate.

For a receipt printer or a slip printer, the Test Print button may display a form that allows the user to choose the type of test and to start the test.

For an MICR reader, the Test Read button may display a form that allows the user to start a MICR (check) read operation. Successful completion will display the data that was returned. An error will display whatever error information is available.

As represented, for example in FIG. 16, the keyboard HTML screen 1600 is divided into 4 major areas (panels) with a picture in the upper left panel 1602. The upper right panel 1604 is a "status zone". For this area for the printer (when displayed), the system polls the printer at 5 second intervals to retrieve and display the current Serial Number, Firmware Version and Operator Key setting. If there is no keyboard plugged in, the display indicates this.

The action buttons on the lower left panel 1606 include "Summary" and "Test." When clicked these buttons change the display in the large lower right panel 1608. The Summary button (default display) may show the TCO counters.

A lights test illuminates and extinguishes the lights in a pattern that is duplicated on the screen display. The operator may then visually verify that the lights are operating correctly.

The keyboard test may display a graphic of the keyboard and allow the operator to press keys. Each key that is pressed is illuminated on the display so that the operator may visually confirm that the keyboard is operating correctly.

The key switch test may sample the state of the key switch at 5 second intervals and display the current setting.

The magnetic stripe reader ("MSR") test may enable the reader and wait for data. The data is displayed along with any error information available.

The Beeper test may run a recognizable sequence of different tones and durations. The operator may then verify whether the beeper sounded correctly. Another test varies the beep emitted when a key is pressed.

It should be appreciated that the inventions described herein are applicable to and may be applied to a variety of POS devices, POS peripherals and other system components and applications. In addition, many different forms of status information, configuration information, commands, responses and messages may be utilized in a system constructed or method practiced according to the invention. Also, a variety of hardware and software components may be monitored in such a system or method.

Different embodiments of the invention may include a variety of hardware and software processing components. In some embodiments of the invention, hardware components such as controllers, state machines and/or logic are used in a system constructed in accordance with the invention. In some embodiment of the invention, code such as software or firmware executing on one or more processing devices may be used to implement one or more of the described operations.

Such components may be implemented on one or more integrated circuits. For example, in some embodiments several of these components may be combined within a single integrated circuit. In some embodiments some of the components may be implemented as a single integrated circuit. In some embodiments some components may be implemented as several integrated circuits.

The components and functions described herein may be connected/coupled in many different ways. The manner in which this is done may depend, in part, on whether the components are separated from the other components. In some embodiments some of the connections represented by the lead lines in the drawings may be in an integrated circuit, on a circuit board and/or over a backplane to other circuit boards. In some embodiments some of the connections represented by the lead lines in the drawings may comprise a data network, for example, a local network and/or a wide area network (e.g., the Internet).

The signals discussed herein may take several forms. For example, in some embodiments some signals may be electrical signals that are transmitted over a wire while other signals may consist of light pulses transmitted over an optical fiber or wireless (e.g., radio frequency) signals. A signal may comprise more than one signal. For example, a differential signal comprises two complementary signals or some other combination of signals.

Signals as discussed herein also may take the form of data. For example, in some embodiments an application program may send a signal to another application program. Such a signal may be stored in a data memory.

The components and functions described herein may be connected/coupled directly or indirectly. Thus, in some embodiments there may or may not be intervening devices (e.g., buffers) between connected/coupled components.

A wide variety of devices may be used to implement the data memories (e.g., the non-volatile memories) discussed herein. For example, a data memory may comprise one or more RAM, disk drive, SDRAM, FLASH, EEPROM or other types of data storage devices.

In summary, the invention described herein teaches an improved point of sale system. While certain illustrative embodiments have been described in detail and shown in the accompanying drawings, it is to be understood that such embodiments are merely illustrative of and not restrictive of the broad invention. In particular, it should be recognized that the teachings of the invention apply to a wide variety of systems and processes that are configurable. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

The invention claimed is:

1. A method of monitoring a point of sale peripheral comprising:
   monitoring interactions between at least one application executing on a point of sale terminal and at least one point of sale peripheral;
   processing, by the point of sale terminal, the monitored interactions to obtain status or error information associated with the at least one point of sale peripheral, the processing including determining a number of occurrences of a type of error and comparing the number to a predetermined error threshold; and
   generating, by the point of sale terminal, an indication that the at least one point of sale peripheral is about to fail in response to the comparing.

2. The method of claim 1 wherein the at least one application comprises at least one point of sale application.

3. The method of claim 1 further comprising identifying the at least one point of sale peripheral according to configuration information stored on the at least one point of sale peripheral.

4. The method of claim 1 further comprising performing failure analysis for the at least one point of sale peripheral according to the status or error information.

5. The method of claim 1 further comprising identifying a component of the at least one point of sale peripheral that has failed, is about to fail or is in need of maintenance.

6. The method of claim 1 further comprising generating maintenance recommendations for the at least one point of sale peripheral according to the status or error information.

7. The method of claim 1 further comprising comparing usage of the at least one point of sale peripheral according to the status or error information with at least one duty cycle of the at least one point of sale peripheral.

8. The method of claim 1 wherein the indication is provided to a remote management tool.

9. The method of claim 1 wherein monitoring comprises using a driver filter to process communications to and from the at least one point of sale peripheral.

10. The method of claim 1 further comprising providing the data to a management tool using CIM.

11. The method of claim 1 further comprising manipulating the status or error information for storage in a repository to enable a management tool to access the status or error information.

12. The method of claim 1 wherein the interactions comprise status or error information received from the at least one point of sale peripheral.

13. The method of claim 1 wherein the interactions comprise messages sent between the at least one application executing on a point of sale terminal and the at least one point of sale peripheral.

14. The method of claim 13 wherein monitoring comprises passively monitoring the messages.

15. A method of monitoring a point of sale peripheral comprising:
   monitoring interactions between at least one application executing on a point of sale terminal and at least one point of sale peripheral;
   processing, by the point of sale terminal, the monitored interactions to identify an unhealthy state of the at least one point of sale peripheral, the processing comprising determining usage of the at least one point of sale peripheral and comparing the usage to a usage threshold; and
   generating, by the point of sale terminal, an indication of the unhealthy state in response to the comparing.

16. The method of claim 15 wherein the processing comprises identifying a component of the at least one point of sale peripheral that has failed, is about to fail or is in need of maintenance.

17. The method of claim 15 wherein the processing comprises generating maintenance recommendations for the at least one point of sale peripheral according to the unhealthy state.

18. The method of claim 15 wherein the at least one application comprises at least one point of sale application.

19. The method of claim 15 wherein the interactions comprise status or error information received from the at least one point of sale peripheral.

20. The method of claim 15 wherein monitoring comprises receiving status or error messages from the at least one point of sale peripheral.

21. The method of claim 15 wherein generating the indication comprises sending a message to at least one of a help desk and a display terminal associated with the point of sale terminal.

22. The method of claim 15 wherein the unhealthy state indicates that the at least one point of sale peripheral has failed, is about to fail or requires maintenance.

23. The method of claim 15 comprising sending the indication to a remote management tool.

24. The method of claim 15 wherein the interactions comprise messages sent between the at least one application executing on a point of sale terminal and the at least one point of sale peripheral.

25. The method of claim 24 wherein monitoring comprises passively monitoring the messages.

26. A method of monitoring the health of at least one point of sale peripheral comprising:
   monitoring, by a point of sale terminal, messages associated with at least one point of sale peripheral;
   extracting, by the point of sale terminal, usage information from the messages;
   comparing, by the point of sale terminal, the usage information with at least one usage threshold to determine whether the at least one point of sale peripheral has failed, is about to fail or requires maintenance, wherein the at least one usage threshold comprises an operating life expectancy of a component of the at least one point of sale peripheral; and generating, by the point of sale terminal, an indication that the at least one point of sale peripheral has failed, is about to fail or requires maintenance.

27. The method of claim 26 wherein monitoring comprises receiving status or error messages from the at least one point of sale peripheral.

28. The method of claim 26 wherein monitoring comprises:

passively monitoring messages between the point of sale terminal and the at least one point of sale peripheral; and processing the messages to identify at least one status or error associated with the at least one point of sale peripheral.

29. The method of claim 26 wherein monitoring comprises monitoring messages sent from the at least one point of sale peripheral to the point of sale terminal.

30. The method of claim 26 wherein monitoring comprises using a driver filter to process communications from the at least one point of sale peripheral.

31. The method of claim 26 comprising processing usage data associated with the component of the at least one point of sale peripheral, the usage data comprising at least one of the group consisting of at least one period of time the component has been operated and the number of times the component has been operated.

32. The method of claim 26 comprising performing failure analysis for the at least one point of sale peripheral in accordance with the usage information.

33. The method of claim 26 comprising identifying a component of the at least one point of sale peripheral that has failed or is in need of maintenance.

34. The method of claim 26 comprising generating maintenance recommendations for the at least one point of sale peripheral in accordance with the usage information.

35. The method of claim 26 wherein generating the indication comprises sending a message to at least one of a help desk and a display terminal associated with the point of sale terminal.

36. The method of claim 26 wherein generating the indication comprises storing information in a database.

37. The method of claim 26 comprising sending the indication to a remote management tool.

38. A method of reporting the health of a point of sale peripheral comprising:

monitoring, by a point of sale peripheral, operating conditions on the point of sale peripheral;

generating status or error information on the point of sale peripheral in accordance with the monitoring;

sending the status or error information from the point of sale peripheral to a point of sale terminal;

extracting, by the point of sale terminal, usage information from the received status or error information;

processing, by the point of sale terminal, the usage information to determine whether the point of sale peripheral has failed, is about to fail or requires maintenance, the processing comprising comparing the usage information with at least one usage threshold; and generating, by the point of sale terminal, an indication that the point of sale peripheral has failed, is about to fail or requires maintenance.

39. The method of claim 38 wherein monitoring comprises collecting usage data associated with the point of sale peripheral, the usage data comprising at least one of the group consisting of at least one period of time the point of sale peripheral has been operated and the number of times the point of sale peripheral has been operated.

40. The method of claim 38 wherein monitoring comprises collecting usage data associated with at least one component of the point of sale peripheral, the usage data comprising at least one of the group consisting of at least one period of time the at least one component has been operated and the number of times the at least one component has been operated.

41. The method of claim 38 wherein the status or error information comprises at least one of the group consisting of serial number, type of point of sale peripheral, date of manufacture of the point of sale peripheral, firmware level for the point of sale peripheral, and operating life expectancy of at least one component of the point of sale peripheral.

42. The method of claim 38 wherein processing comprises processing usage data associated with a component of the point of sale peripheral, the usage data comprising at least one of the group consisting of at least one period of time the component has been operated and the number of times the component has been operated.

43. The method of claim 38 wherein processing comprises performing failure analysis for the point of sale peripheral in accordance with the status or error information.

44. The method of claim 38 wherein processing comprises identifying a component of the point of sale peripheral that has failed, is about to fail or is in need of maintenance.

45. The method of claim 38 wherein processing comprises generating maintenance recommendations for the point of sale peripheral in accordance with the status or error information.

46. The method of claim 38 wherein generating the indication comprises sending a message to at least one of a help desk and a display terminal associated with the point of sale terminal.

47. The method of claim 38 wherein generating the indication comprises storing information in a database.

48. The method of claim 38 comprising sending the indication to a remote management tool.

49. The method of claim 38 wherein the usage information comprises at least one of the group consisting of at least one period of time a component of the point of sale peripheral has been operated, the number of times the component has been operated and an operating life expectancy of the component.

50. A method of monitoring a point of sale peripheral comprising:

monitoring interactions between at least one application executing on a point of sale terminal and at least one point of sale peripheral;

processing, by the point of sale terminal, the monitored interactions to obtain status or error information associated with the at least one point of sale peripheral, the processing including determining a number of occurrences of a type of error and comparing the number to a predetermined error threshold; and generating, by the point of sale terminal, an indication that the at least one point of sale peripheral requires maintenance in response to the comparing.

51. The method of claim 50 wherein the at least one application comprises at least one point of sale application.

52. The method of claim 50 further comprising identifying the at least one point of sale peripheral according to configuration information stored on the at least one point of sale peripheral.

53. The method of claim 50 further comprising performing failure analysis for the at least one point of sale peripheral according to the status or error information.

54. The method of claim 50 further comprising identifying a component of the at least one point of sale peripheral that has failed, is about to fail or is in need of maintenance.

55. The method of claim 50 further comprising generating maintenance recommendations for the at least one point of sale peripheral according to the status or error information.

56. The method of claim 50 further comprising comparing usage of the at least one point of sale peripheral according to the status or error information with at least one duty cycle of the at least one point of sale peripheral.

57. The method of claim 50 wherein the indication is provided to a remote management tool.

58. The method of claim 50 wherein monitoring comprises using a driver filter to process communications to and from the at least one point of sale peripheral.

59. The method of claim 50 further comprising providing the data to a management tool using CIM.

60. The method of claim 50 further comprising manipulating the status or error information for storage in a repository to enable a management tool to access the status or error information.

61. The method of claim 50 wherein the interactions comprise status or error information received from the at least one point of sale peripheral.

62. The method of claim 50 wherein the interactions comprise messages sent between the at least one application executing on a point of sale terminal and the at least one point of sale peripheral.

63. The method of claim 62 wherein monitoring comprises passively monitoring the messages.

* * * * *